United States Patent
Fwu et al.

(10) Patent No.: US 9,608,710 B2
(45) Date of Patent: Mar. 28, 2017

(54) TECHNIQUES FOR DEVICE-TO-DEVICE COMMUNICATIONS

(71) Applicant: Intel IP Corporation, Santa Clara, CA (US)

(72) Inventors: Jong-Kae Fwu, Sunnyvale, CA (US); Debdeep Chatterjee, Santa Clara, CA (US); Alexey Khoryaev, Nizhny Novgorod (RU); Gang Xiong, Beaverton, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/454,639

(22) Filed: Aug. 7, 2014

(65) Prior Publication Data
US 2015/0043398 A1    Feb. 12, 2015

Related U.S. Application Data

(60) Provisional application No. 61/863,902, filed on Aug. 8, 2013.

(51) Int. Cl.
*H04B 7/212* (2006.01)
*H04B 7/06* (2006.01)
(Continued)

(52) U.S. Cl.
CPC .......... *H04B 7/0626* (2013.01); *H04B 7/0617* (2013.01); *H04B 7/0639* (2013.01); *H04L 1/1812* (2013.01); *H04L 5/0048* (2013.01); *H04L 5/0058* (2013.01); *H04L 5/14* (2013.01); *H04W 4/005* (2013.01); *H04W 24/10* (2013.01); *H04W 36/08* (2013.01); *H04W 36/28* (2013.01);
(Continued)

(58) Field of Classification Search
CPC .......... H04L 2012/5608; H04W 84/12; H04W 88/08; H04W 80/04; H04W 88/06; H04W 84/18; H04W 74/08; H04W 80/00
USPC ...................... 370/310.2, 328, 338, 349, 330
See application file for complete search history.

(56) References Cited

U.S. PATENT DOCUMENTS 8,183,690 B2 * 5/2012 Tanaka ................... H01L 24/11
257/737
2009/0190541 A1    7/2009  Abedi
(Continued)

FOREIGN PATENT DOCUMENTS

WO    2013075340    5/2013
WO    2013112372    8/2013

OTHER PUBLICATIONS

International Search Report and Written Opinion received for PCT Patent Application No. PCT/US2014/050373, mailed Nov. 19, 2014, 10 pages.
(Continued)

*Primary Examiner* — Brenda H Pham

(57) ABSTRACT

Examples may include techniques to enable user equipment (UE) to establish a device-to-device (D2D) communication link for D2D communications with another UE. In some examples, the D2D communications may occur when either both or at least one UE is within a coverage area for a wireless wide area network (WWAN). In some other examples, both UEs may be outside of the coverage area and may utilize a third UE to provide or relay information for use to establish the D2D communication link.

17 Claims, 16 Drawing Sheets

(51) Int. Cl.

| | | |
|---|---|---|
| *H04L 5/14* | (2006.01) | |
| *H04W 56/00* | (2009.01) | |
| *H04W 4/00* | (2009.01) | |
| *H04W 52/02* | (2009.01) | |
| *H04W 76/04* | (2009.01) | |
| *H04W 36/08* | (2009.01) | |
| *H04W 72/08* | (2009.01) | |
| *H04W 76/02* | (2009.01) | |
| *H04W 36/28* | (2009.01) | |
| *H04L 5/00* | (2006.01) | |
| *H04W 24/10* | (2009.01) | |
| *H04L 1/18* | (2006.01) | |
| *H04W 72/04* | (2009.01) | |
| *H04W 4/02* | (2009.01) | |
| *H04W 36/14* | (2009.01) | |
| *H04L 27/26* | (2006.01) | |
| *H04W 88/08* | (2009.01) | |

(52) U.S. Cl.
CPC ... *H04W 52/0206* (2013.01); *H04W 52/0209* (2013.01); *H04W 56/0005* (2013.01); *H04W 72/082* (2013.01); *H04W 76/02* (2013.01); *H04W 76/023* (2013.01); *H04W 76/046* (2013.01); *H04L 5/0053* (2013.01); *H04L 5/1469* (2013.01); *H04L 27/2602* (2013.01); *H04W 4/023* (2013.01); *H04W 36/14* (2013.01); *H04W 72/0406* (2013.01); *H04W 72/0446* (2013.01); *H04W 88/08* (2013.01); *Y02B 60/50* (2013.01)

(56) References Cited

U.S. PATENT DOCUMENTS

| | | | |
|---|---|---|---|
| 2011/0255450 A1* | 10/2011 | Wang | H04W 72/0493 370/280 |
| 2011/0268101 A1* | 11/2011 | Wang | H04L 5/0053 370/344 |
| 2011/0282989 A1 | 11/2011 | Geirhofer et al. | |
| 2013/0109301 A1 | 5/2013 | Hakola et al. | |
| 2014/0003400 A1* | 1/2014 | Lim | H04L 1/1861 370/336 |
| 2014/0185529 A1 | 7/2014 | Lim et al. | |

OTHER PUBLICATIONS

"Study on LTE Device to Device Proximity Services", 3GPP TSG RAN Meeting #58, RP122009, Qualcomm, Dec. 2012, 6 pages (Author unknown).

"3GPP TS 36.212 V11.0.0, 3rd Generation Partnership Project; Technical Specification Group Radio Access Network; Evolved Universal Terrestrial Radio Access (E-UTRA); Multiplexing and channel coding (Release 11)", (Sep. 2012), pp. 1-40, (Author unknown).

"3GPP TS 36.212 V11.0.0, 3rd Generation Partnership Project; Technical Specification Group Radio Access Network; Evolved Universal Terrestrial Radio Access (E-UTRA); Multiplexing and channel coding (Release 11)", (Sep. 2012), pp. 41-79, (Author unknown).

"3GPP TS 36.331 V11.0.0, 3rd Generation Partnership Project-;Technical Specification Group Radio Access Network; Evolved Universal Terrestrial Radio Access (E-UTRA); Radio Resource Control (RRC); Protocol specification, (Release 11)", (Jun. 2012), 302 pages, (Author unknown).

"3GPP TS 36.211 V11.0.0, 3rd Generation Partnership Project; Technical Specification Group Radio Access Network; Evolved Universal Terrestrial Radio Access (E-UTRA); Physical Channels and Modulation, (Release 11)", (Sep. 2012), pp. 1-55, (Author unknown).

"3GPP TS 36.211 V11.0.0, 3rd Generation Partnership Project; Technical Specification Group Radio Access Network; Evolved Universal Terrestrial Radio Access (E-UTRA); Physical Channels and Modulation, (Release 11)", (Sep. 2012), pp. 56-106, (Author unknown).

"3GPP TS 36.213 V11.0.0, 3rd Generation Partnership Project; Technical Specification Group Radio Access Network; Evolved Universal Terrestrial Radio Access (E-UTRA); Physical Channels and Modulation, (Release 11)", (Sep. 2012), pp. 1-65, (Author unknown).

"3GPP TS 36.213 V11.0.0, 3rd Generation Partnership Project; Technical Specification Group Radio Access Network; Evolved Universal Terrestrial Radio Access (E-UTRA); Physical Channels and Modulation, (Release 11)", (Sep. 2012), pp. 65-115, (Author unknown).

"3GPP TS 36.213 V11.0.0, 3rd Generation Partnership Project; Technical Specification Group Radio Access Network; Evolved Universal Terrestrial Radio Access (E-UTRA); Physical Channels and Modulation, (Release 11)", (Sep. 2012), pp. 116-143, (Author unknown).

* cited by examiner

*Configuration Table 200*

| Uplink-Downlink Configuration | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |

*FIG. 2*

*Configuration Table 300*

| Uplink-Downlink Configuration | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 7 | 10ms | D | S | U | U | U | U | U | U | U | D |
| 8 | 10ms | D | S | U | U | U | U | U | U | U | U |
| 9 | N/A | D | D | D | D | D | D | D | D | D | D |
| 10 | 1ms | S | S | S | S | S | S | S | S | S | S |

RECEIVE, AT A FIRST UE CAPABLE OF OPERATING IN COMPLIANCE WITH ONE OR MORE 3GPP LTE STANDARDS INCLUDING LTE-A, SYSTEM INFORMATION THAT INDICATES A D2D REGION THAT IS DEFINED USING A SET OF TYPE 2 FRAME STRUCTURE SUBFRAMES
*1102*

RECEIVE A SYNCHRONIZATION SIGNAL FROM A SYNCHRONIZATION SOURCE TO OBTAIN TIME AND FREQUENCY SYNCHRONIZATION FOR USE OF THE D2D REGION TO COMMUNICATE WITH A SECOND UE
*1104*

RECEIVE A D2D DATA COMMUNICATION FROM THE SECOND UE BASED ON USE OF THE D2D REGION
*1106*

*FIG. 11*

Storage Medium 1200

*Computer Executable Instructions for 1100*

RECEIVE, AT A FIRST UE CAPABLE OF OPERATING IN COMPLIANCE WITH ONE OR MORE 3GPP LTE STANDARDS INCLUDING LTE-A, SYSTEM INFORMATION THAT INDICATES A D2D REGION THAT IS DEFINED USING A SET OF TYPE 2 FRAME STRUCTURE SUBFRAMES
1402

RECEIVE A SYNCHRONIZATION SIGNAL FROM A SYNCHRONIZATION SOURCE TO OBTAIN TIME AND FREQUENCY SYNCHRONIZATION FOR USE OF THE D2D REGION TO COMMUNICATE WITH A SECOND UE
1404

SEND A D2D DATA COMMUNICATION FROM THE SECOND UE BASED ON USE OF THE D2D REGION
1406

*FIG. 14*

Storage Medium 1500

*Computer Executable Instructions for 1400*

*FIG. 15*

TECHNIQUES FOR DEVICE-TO-DEVICE COMMUNICATIONS

RELATED CASE

This application claims priority to U.S. Provisional Patent Application No. 61/863,902, filed on Aug. 8, 2013, that is hereby incorporated by reference in its entirety.

TECHNICAL FIELD

Examples described herein are generally related to wireless communication devices.

BACKGROUND

Proximity-based applications or services for wireless devices or user equipment (UE) represent a growing social and technological trend. This growing trend may have a substantial impact on the evolution of cellular wireless/mobile broadband technologies. These proximity-based applications or services are typically based on an awareness of two UEs being close or proximate to each other. Applications may include public safety operations, social networking, mobile commerce, advertisement, gaming, etc. Design and development of new types of device-to-device (D2D) communication may be interwoven with advancements in wireless technologies with respect to spectrum usage, spectral efficiency or energy efficiencies.

BRIEF DESCRIPTION OF THE DRAWINGS

FIG. 2 illustrates an example first configuration table.
FIG. 3 illustrates an example second configuration table.
FIG. 11 illustrates an example of a first logic flow.
FIG. 12 illustrates an example of a first storage medium.
FIG. 14 illustrates an example of a second logic flow.
FIG. 15 illustrates an example of a second storage medium.

DETAILED DESCRIPTION

Figure 1:
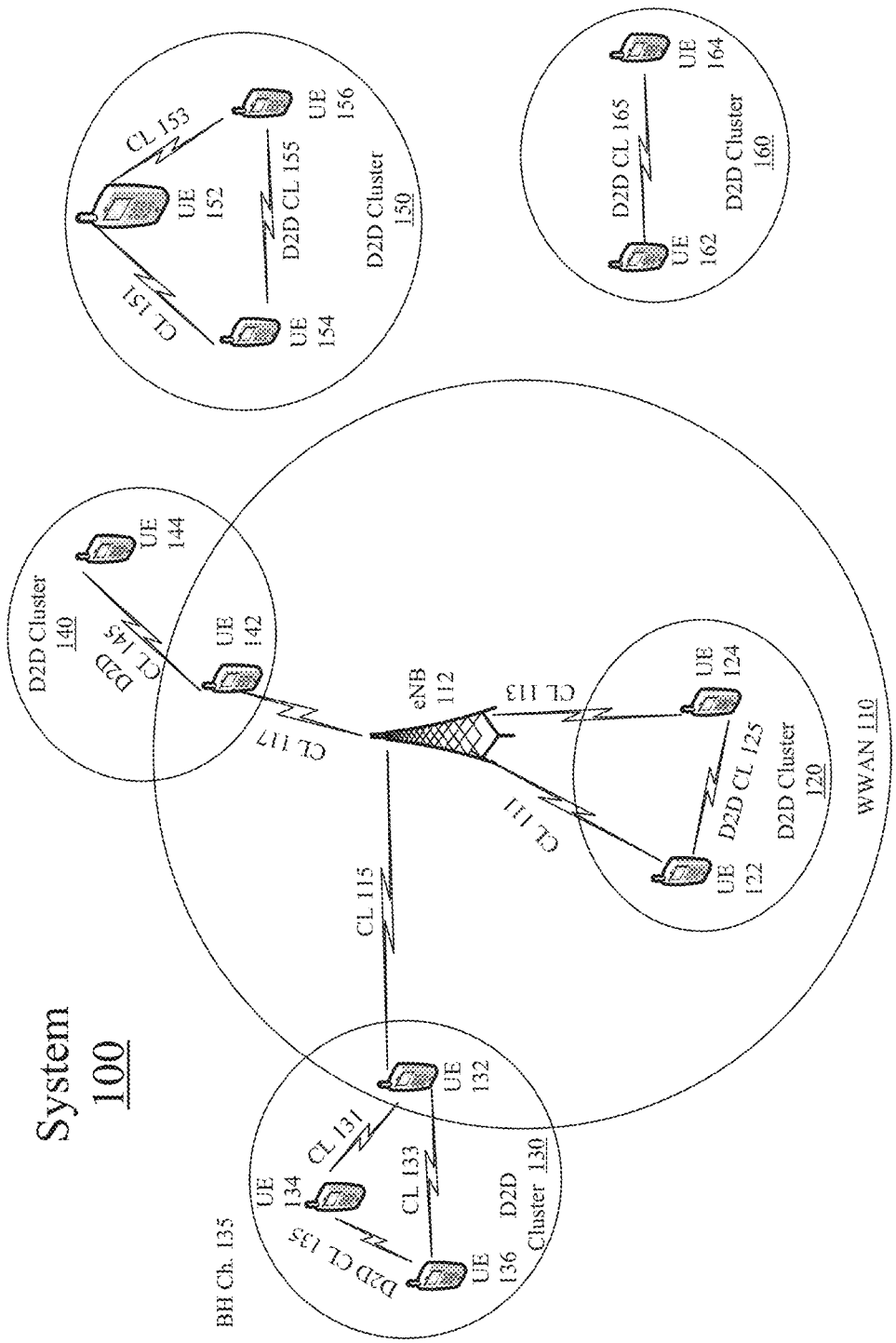
FIG. 1 illustrates an example of a first system.

Examples are generally directed to improvements for device-to-device (D2D) communications and/or wireless wide area networks (WWANs) using wireless mobile telecommunication cellular or wireless mobile broadband technologies. Wireless mobile broadband technologies may include any wireless technologies suitable for use with wireless devices or user equipment (UE), such as one or more third generation (3G), fourth generation (4G) or emerging fifth generation (5G) wireless standards, revisions, progeny and variants. Examples of wireless mobile broadband technologies may include without limitation any of the Institute of Electrical and Electronics Engineers (IEEE) 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8, 9, 10 or 11 of LTE/System Architecture Evolution (SAE), and so forth. The examples are not limited in this context.

By way of example and not limitation, various examples may be described with specific reference to various 3GPP radio access network (RAN) standards, such as the 3GPP Universal Terrestrial Radio Access Network (UTRAN), the 3GPP Evolved Universal Terrestrial Radio Access Network (E-UTRAN) and 3GPP's suite of UMTS and LTE/LTE-Advanced Technical Specifications (in case of LTE/LTE-Advanced collectively "3GPP LTE Specifications" according to the 36 Series of Technical Specifications), and IEEE 802.16 standards, such as the IEEE 802.16-2009 standard and current third revision to IEEE 802.16 referred to as "802.16Rev3" consolidating standards 802.16-2009, 802.16h-2010 and 802.16m-2011, and the IEEE 802.16p draft standards including IEEE P802.16.1b/D2 Jan. 2012 titled "Draft Amendment to IEEE Standard for Wireless-MAN-Advanced Air Interface for Broadband Wireless Access Systems, Enhancements to Support Machine-to-Machine Applications" (collectively "IEEE 802.16 Standards"), and any drafts, revisions or variants of the 3GPP LTE Specifications and the IEEE 802.16 Standards. Although some embodiments may be described as a 3GPP LTE Specifications or IEEE 802.16 Standards system by way of example and not limitation, it may be appreciated that other types of communications system may be implemented as various other types of mobile broadband communications systems and standards. The examples are not limited in this context.

As contemplated in the present disclosure, design and development of new types of D2D communication may be interwoven with advancements in wireless technologies. In order to enable efficient operation of UEs designed for D2D communications with these advancements, modifications and/or enhancements may be needed to current or planned 3GPP LTE or LTE-A standards. These modifications and/or enhancements may be necessary at multiple protocol layers to include, but not limited to, the physical (PHY) or media access control (MAC) protocol layers. Elements of existing protocols layers such as the PHY protocol layer should be reused to facilitate a quicker adoption of these modifications and/or enhancements. It is with respect to these and other challenges that the examples described herein are needed.

In some examples, techniques are implemented for D2D communications. The techniques may include receiving, at a first UE capable of operating in compliance with one or more 3GPP LTE standards including LTE-A, system information that indicates a D2D region that is defined using a set of type 2 frame structure subframes. The techniques may also include receiving a synchronization signal from a synchronization source to obtain time and frequency synchronization for use of the D2D region to communicate with a second UE. The techniques may also include receiving/sending a D2D data communication from/to the second UE based on use of the D2D region.

FIG. 1 illustrates an example system 100. In some examples, as shown in FIG. 1, system 100 includes a wide area wireless network (WWAN) 110 and device-to-device (D2D) clusters 120, 130, 140, 150 and 160. For the examples shown in FIG. 1, D2D clusters 120, 130, 140, 150 and 160 include respective UEs 122, 124, 132, 134, 136, 142, 144, 152, 154, 156, 162 and 164. Also, WWAN 110 is shown as including a base station or evolved Node B (eNB) 112 that may communicatively couple to one or more UEs falling within a coverage area of WWAN 110. According to some examples, elements of system 100, as shown in FIG. 1, may be capable of operating according to one or more 3GPP Specifications including LTE-A.

In some examples, the various D2D clusters shown in FIG. 1 may be either within the coverage area of WWAN 110 (e.g., D2D cluster 120), partially within the coverage area of WWAN 110 (e.g., D2D clusters 132 or 142) or outside the coverage area of WWAN 110 (e.g., D2D clusters 150 or 160). For each of these three coverage scenarios, at least one wireless D2D communication link (CL) is established between at least two UEs of a D2D cluster. As described in more detail below, a given D2D CL may be established between UEs to send or receive D2D communications which may be associated with a unicast session, a groupcast session or a broadcast session over the established D2D CL.

According to some examples, an in-coverage scenario such as D2D cluster 120 may include UEs 122 and 124 coupled to eNB 112 via respective wireless links 111 and 113. For these examples, a D2D CL such as D2D CL 125 may be established between UEs 122 and 124 to allow for direct communication between these UEs that may be off-network. Meanwhile synchronization signals and resource allocations may still be controlled or managed by eNB 112 of WWAN 110. This may occur, for example, in a situation where an incident commander for a police or fire response having a first UE desires to maintain direct communication confidentiality with an incident responder having a second UE. As described more below, logic and/or features at these UEs may be capable of receiving system information (e.g., via a system information block (SIB) from an eNB for a WWAN such as eNB 112 that indicates a D2D region that is defined using a set of type 2 frame structure subframes that may be used to establish a D2D CL to receive or send D2D communications. Also, the logic and/or features may be capable of receiving a synchronization signal from the eNB for use of the D2D region to enable communications between these UEs.

In some examples, a partial coverage scenario such as D2D clusters 130 or 140 may include at least one UE of a D2D cluster coupled to an eNB such as eNB 112. For example, UE 132 and UE 142 may couple to eNB 112 via respective wireless CLs 115 and 117. Logic and/or features at UEs such as UE 132 or UE 142 may be capable of receiving similar system information as mentioned above for D2D cluster 125 that indicates the D2D region that may be used to establish a given D2D CL. UEs 132 or UE 142 may forward or relay the system information to other UEs in their respective D2D cluster. Also, the logic and/or features at UEs such as UEs 132 or 142 may be capable of receiving a synchronization signal from the eNB and may relay the synchronization signal for use of the D2D region by these other UEs. Alternatively, the logic and/or features of UEs 132 or 142 may capable of being a second synchronization source and generate a second synchronization signal via which other UEs in their respective D2D cluster may use the D2D region. For these alternatives, the second synchronization signal may be differentiated from a first synchronization signal from the eNB to ensure that the other UEs do not confuse synchronization signals from more than one synchronization source. Differentiation may occur via an offset in a frequency domain between the two synchronization signals or use of a modified sequence for the second synchronization signal as compared to a sequence for the first synchronization signal.

According to some examples, a partial coverage scenario may occur in a situation where at least some UEs in a D2D cluster are outside of coverage for a WWAN and at least one UE is located within the coverage of the WWAN. This type of scenario may occur in a rural area such as an emergency response to a plane crash that may require a relay UE to couple to the WWAN. Further, if terrain features such heavy foliage or steep canyons make non-terrestrial communications (e.g., satellite) unreliable, a relay UE may also be needed. Also, another rural area response that may include a police response to a domestic dispute in a residence. The residence or building may disrupt non-terrestrial communications and this may lead to a need for a relay UE.

In some examples, an outside of coverage scenario such as D2D clusters 150 or 160 may include all the UEs of a D2D cluster being outside a communication range of eNB 112. For these examples, UEs at these D2D clusters may be capable of communicating using a dedicated public safety spectrum (e.g., 700 megahertz (MHz)). For these examples, rather than receive the system information from an eNB, one of the UEs may serve as a master UE (M-UE) or peer radio head (PRH) and that UE may send the system information to the other UEs in the D2D cluster. Similar to eNB sent system information, the system information sent from the M-UE or PRH may indicate a D2D region that is defined using a set of type 2 frame structure subframes that may be used to establish a D2D CL to receive or send D2D communications. The M-UE or PRH may also serve as a synchronization source for a synchronization signal sent to the other UEs for use of the D2D region to enable communications over the D2D CL. Outside coverage scenarios may occur due to similar situations as mentioned above for partial coverage scenarios with the exception that no relay UE in the D2D cluster is present to link back to a WWAN.

According to some examples, UEs such as UEs 122, 124, 132, 134, 136, 142, 144, 152, 154, 156, 162 or 164 may be any electronic device having wireless capabilities or equipment. For some examples, UE 122 may be implemented in a fixed or mobile device. A fixed device generally refers to an electronic device designed to be in a fixed, stationary, permanent or otherwise non-moving position or location that does not vary over time. For instance, a fixed device may be installed with fixtures, attachments and housings to prohibit movement, including wired power lines, transmission lines, and so forth. By way of contrast, a mobile device is designed to be portable enough to be frequently moved between various locations over time. It may be appreciated that although a fixed device is generally stationary, some fixed devices may be disconnected from their current equipment in a first fixed location, moved to a second fixed location, and connected to equipment at the second fixed location.

FIG. 2 illustrates an example of a first configuration table. In some examples, as shown in FIG. 2, the first configuration table includes configuration table 200. Configuration table 200 depicts uplink-downlink configurations as defined by LTE-A for time-division duplex (TDD). As shown in FIG. 2, configuration table includes 7 different uplink-downlink configurations 0 to 6. Each configuration may be for a type 2 frame structure having 10 subframes that can be either downlink (DL), special (S) or uplink (UL) subframes. As described more below, at least some of these subframes may be allocated as a proximity uplink (P-UL) subframe, a proximity downlink (P-DL) subframe or a proximity special (P-S) subframe and may be capable of carrying data or control information in specific physical channels. These P-UL, P-DL or P-S subframes may also simultaneously serve transmissions to/from different terminals, devices or UEs arranged to operate using a given configuration. The data or control information, for example, may be for specific physical channels in a WWAN operated in compliance with one or more 3GPP LTE standards including LTE-A. Alternatively, the data or control information may be for specific physical channels between UEs capable of communicating using a dedicated public service spectrum.

FIG. 3 illustrates an example of a second configuration table. In some examples, as shown in FIG. 3, the second configuration table includes configuration table 300. Configuration table 300 depicts uplink-downlink configurations 7-10. These uplink-downlink configurations may be modified versions of the uplink-downlink configurations shown in FIG. 2 for configuration table 200. In other words, uplink-downlink configurations 7-10 may modify at least some uplink or downlink subframes for the LTE-A defined configurations 0-6. For example, uplink-downlink configuration 7 may be a modification of uplink-downlink configuration 0 that includes modifying downlink and special subframes at subframe numbers 5 and 6 to become uplink subframes.

In some examples, modifying uplink or downlink subframes for one or more uplink-downlink configurations for table 200 may also include changing all subframes to special subframes as shown in table 300 for uplink-downlink configuration 10. Changing all subframes to special subframes may allow for flexibility in setting when UEs may use a specific physical channel for P-UL or P-DL subframes that may have a time granularity of less than 1 millisecond (ms). For example, multiple P-UL or P-DL sub-subframes may be included in one or more of the S subframes.

Figure 4:
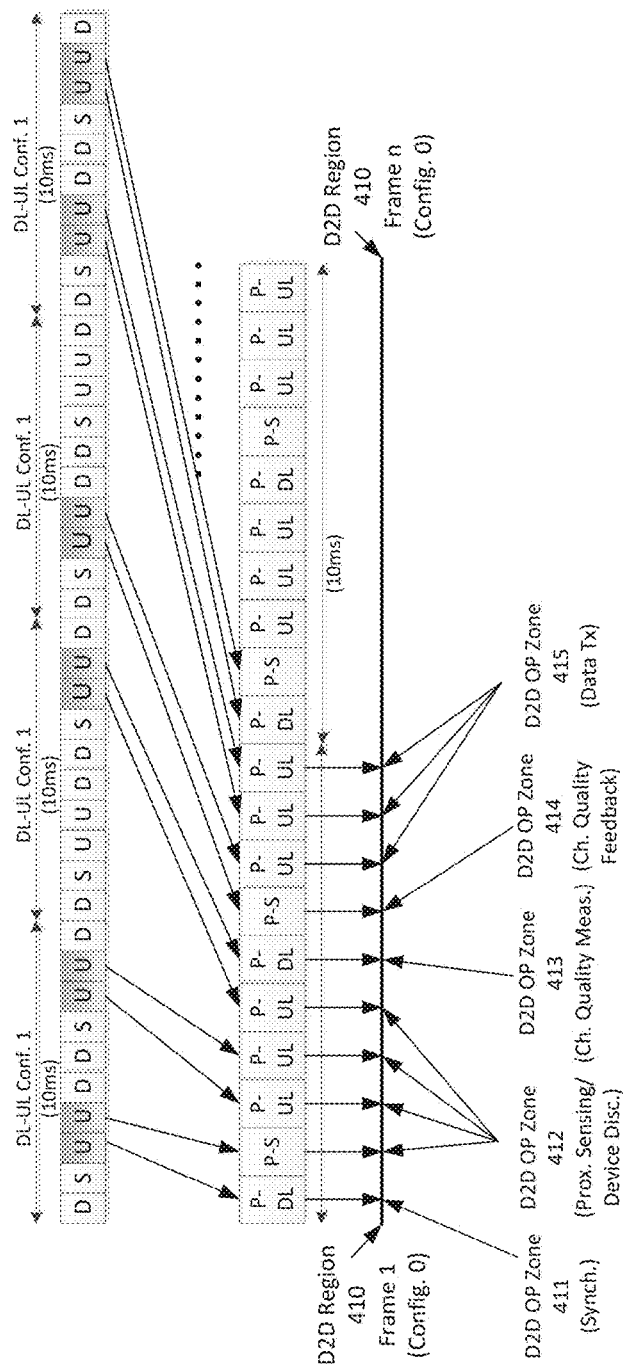
FIG. 4 illustrates an example first D2D region subframe configuration.

FIG. 4 illustrates an example first D2D region subframe configuration. In some examples, as shown in FIG. 4, the first D2D region subframe configuration includes D2D region subframe configuration 400. D2D region subframe configuration 400, for example, may be received by logic and/or features of a first UE in system information (e.g., conveyed in a SystemInformationBlockType1 (SIB1) message) that may indicate a D2D region 410 that is defined using a set of type 2 frame structure subframes. For example, uplink-downlink configuration 1 from an LTE-A compliant or defined table 200 may indicate that D2D region 410 is defined using uplink subframes. For these examples, based on a synchronization signal from a synchronization source (e.g., an eNB or M-UE) that enables the logic and/or features of the first UE to obtain time and frequency synchronization for use of D2D region 410 to communicate with a second UE. For the example D2D region 410 shown in FIG. 4, the UL subframes are allocated as either P-DL, P-UL or proximity-special (P-S) subframes that may be used for D2D communications between the first and second UEs. P-S subframes may be a combination of a shorter-than-1 ms-long P-DL and P-UL subframes having a guard period between them. Also, use of DL subframes This may minimize possible interference received from a likely stronger signal from a relatively more powerful transmitting source such as an eNB that may be transmitting during DL subframes according to uplink-downlink configuration 0.

According to some examples, D2D region 410 may be arranged in a plurality of subsets, each subset may allocated to one of a plurality of D2D operational (OP) zones. For the example shown in FIG. 4, D2D region 410 includes frame 1 and frame n, where "n" is any whole positive integer greater than 1. These frames may be further defined using uplink-downlink configuration 0 from an LTE-A compliant or defined table 200. For example, as shown in FIG. 4, D2D OP zones 411, 412, 413, 414 and 415 may be allocated from subframes included in frame 1. Also, as shown in FIG. 4, subframe(s) allocated to each D2D OP zone may be separately allocated to various operations associated with establishing a D2D CL between UEs. For example, subframe 0 for D2D OP zone 411 may be allocated as a P-DL subframe for synchronization operations, e.g., receiving a synchronization signal. Subframes 1-4 for D2D OP zone 412 may be allocated as a P-S and P-UL subframes, for proximity sensing/device discovery operations to determine if other UEs are proximately located to possibly establish a D2D CL. Subframe 6 for D2D OP zone 414 may be allocated as a P-S subframe that may P-DL and P-UL subframes for channel (ch.) quality feedback. Subframes 7-9 9 for D2D OP zone 415 may be allocated as P-UL subframes for data transmissions to at least send D2D data communications over an established D2D CL with the proximately located UE. Although not shown in FIG. 4, D2D OP zone 415 may include additionally allocated subframes from frame n such as subframe 0 of frame n to use to receive D2D data communications over the established D2D CL. Examples are not limited to allocations for synchronization, channel quality measurements, channel quality feedback, proximity sensing/device discovery or data transmissions, other allocations for other operations associated with establishing and then communicating over a D2D CL are contemplated such as, but not limited to, control information that may be exchanged over the D2D CL In some examples, modified configurations included in configuration table 300 may be modified responsive to a load balancing condition between first and second UEs that have established a D2D CL and may also have a hierarchical relationship. Thus, a flexible uplink-downlink configuration may be possible. For example, a first UE may be designated as an M-UE and the second UE may be designated as a slave UE (S-UE). The M-UE may be arranged to send D2D communications to the S-UE during DL subframes allocated as P-DL or P-S subframes and the S-UE may be arranged to send D2D communications to the M-UE during UL subframes allocated as P-UL or P-S subframes. If the M-UEs is transmitting or sending a higher amount of data traffic compared to the S-UE, subframes of a given uplink-downlink configuration may be modified to include more DLs and less ULs to allow the M-UE to have more P-DL subframes for transmitting D2D communications.

Figure 5:
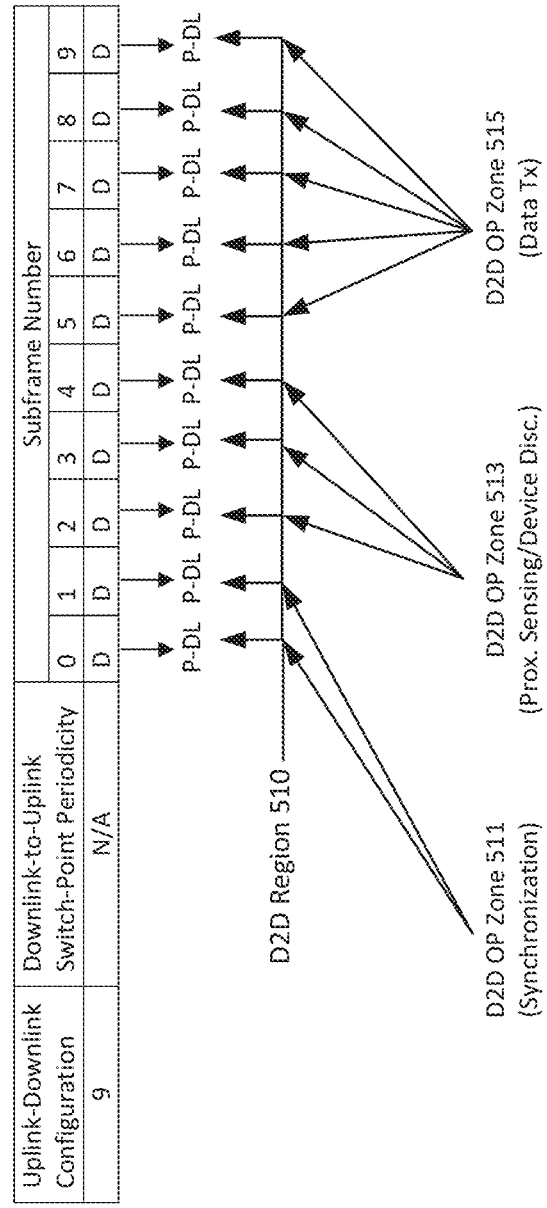
FIG. 5 illustrates an example second D2D region subframe configuration.

FIG. 5 illustrates an example second D2D region subframe configuration. In some examples, as shown in FIG. 5, the second D2D region subframe configuration includes D2D region subframe configuration 500. D2D region subframe configuration 500, for example, may be received by logic and/or features of a first UE in system information (e.g., conveyed in a SystemInformationBlockType1 (SIB1) message) that may indicate a D2D region 510 that is defined using a set of type 2 frame structure subframes. For the example shown in FIG. 5, uplink-downlink configuration 9 from a modified configuration table 300 may indicate that D2D region 510 is defined using subframes 3-9. For these examples, a first UE receiving D2D region subframe configuration 500 may be outside a coverage area for a WWAN operated in compliance with LTE-A. As a result of being outside the coverage area, possible interference from a strong transmitting source is less likely. Therefore, both UL and DL subframes may be included in D2D region 510.

According to some examples, D2D region 510 may be arranged in a plurality of subsets, each subset may be allocated to one of a plurality of D2D OP zones. For example, as shown in FIG. 5, D2D OP zones 511, 513 and 515 may be separately allocated subframes. Also, as shown in FIG. 5, subframe(s) included in each D2D OP zone may be allocated for various operations associated with establishing a D2D CL between UEs. For example, subframes 0 and 1 for D2D OP zone 511 may be allocated P-DL subframes for synchronization operations. Subframes 2-4 for D2D OP zone 513 may be allocated as P-DL subframes for proximity sensing/device discovery operations. Subframes 5-9 for D2D OP zone may be allocated as P-DL subframes for data transmissions.

Figure 6:
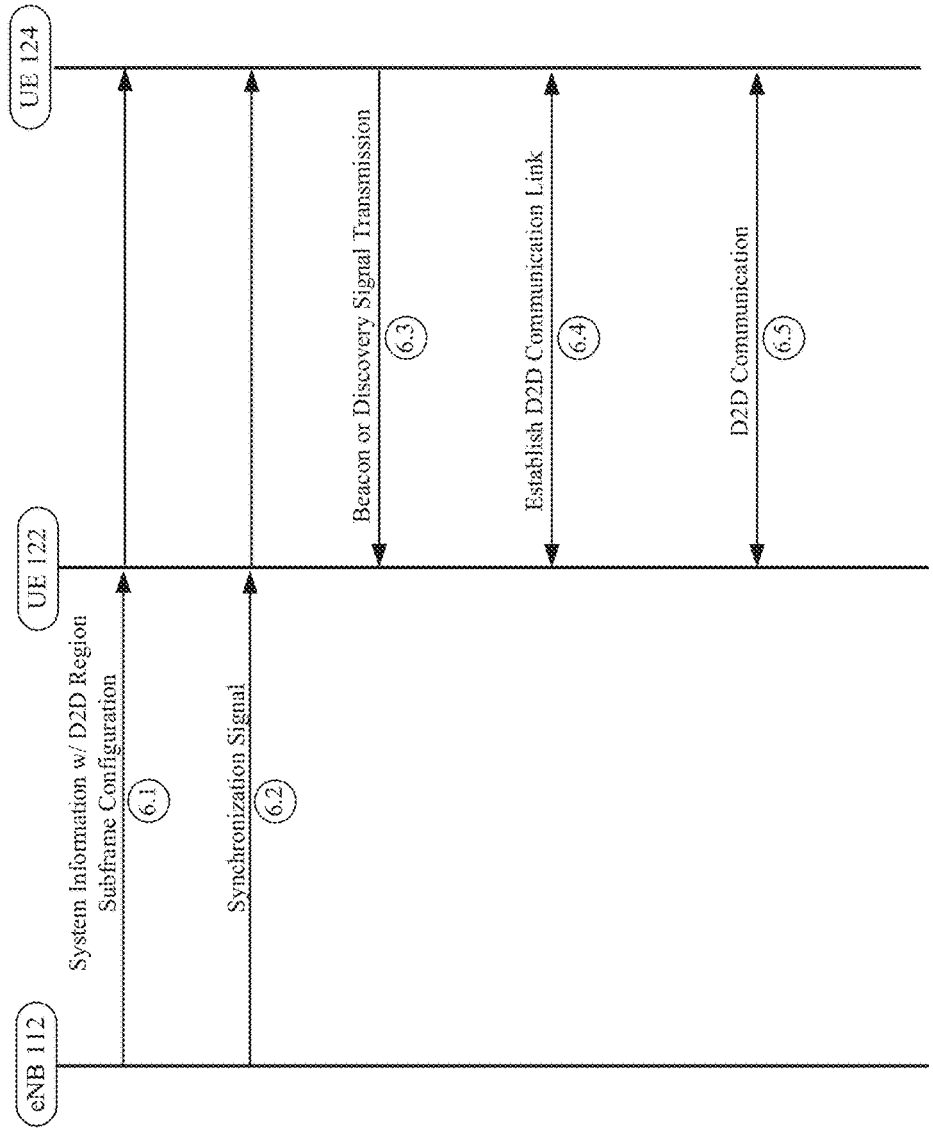
FIG. 6 illustrates an example first process.

In some examples, D2D region subframe configuration 500 may be utilized when a first UE is configured as an M-UE and a second UE is configured as an S-UE. Also, for these examples, D2D communications between these UEs may be via broadcast sessions. Thus, subframes 5-9 are all allocated as P-DL subframes to provide the M-UE with ample bandwidth to broadcast data to the S-UE and possibly to a number of other S-UEs FIG. 6 illustrates a first example process. In some examples, as shown in FIG. 6, the first example process includes process 600. Process 600 may be for establishing a D2D CL between UEs for receiving/sending a D2D communication while both UEs are within a coverage area for a WWAN. For these examples, elements of system 100 as shown in FIG. 1 such as eNB 112, UE 122 and UE 124 may be used to illustrate example operations related to process 600. Also, uplink-downlink configurations as shown in FIGS. 2-3 along with D2D region subframe configurations shown in FIGS. 4-5 may be used to describe at least parts of process 600. However, the example process 600 is not limited to implementations using elements of system 100, uplink-downlink configurations or D2D region subframe configurations shown in FIGS. 1-5.

Beginning at process 6.1 (System Information w/ D2D Region Subframe Configuration), logic and/or features at UE 122 and UE 124 may be capable of each receiving from eNB 112 system information that indicates a D2D region subframe configuration. For example, UE 122 and UE 124 may receive D2D region subframe configuration 400 including D2D region 410 as shown in FIG. 4. UE 122 may receive D2D region subframe configuration 400 via CL 111 and UE 124 may receive D2D region subframe configuration 400 via CL 113. D2D region subframe configuration 400, for example, may be received in a SystemInformationBlockType1 message and that message may indicate that uplink-downlink configuration 0 may be used for TDD communications. Also, D2D region subframe configuration 400 as shown in FIG. 4, may include D2D OP zones 411-415 that each include one or more P-DL, P-S or P-UL subframes allocated for synchronization, channel quality measurements/channel quality feedback, proximity sensing/device discovery or data transmission.

Moving to process 6.2 (Synchronization Signal), logic and/or features at UE 122 and UE 124 may be capable of each receiving a synchronization signal from eNB 112. In some examples, eNB 112 may be serving as a synchronization source and UEs 122 and 124 may use the synchronization signal to obtain time and frequency synchronization for use of D2D region 410 to eventually establish a D2D CL to allow for communication between these two UEs. For these examples, the synchronization signal may be received via use of D2D OP zone 411 which includes subframe 0 allocated as a P-DL subframe.

Moving to process 6.3 (Beacon or Discovery Signal Transmission), logic and/or features at UE 122 may be capable of receiving a beacon or discovery signal transmission from UE 124. In some examples, the beacon or discover signal transmission may be received via use of D2D OP zone 412 which includes subframes 1-4 allocated as P-S and P-UL subframes. For these examples, the received beacon or discovery signal transmission may be capable of indicating to the logic and/or features of UE 122 that UE 124 is in proximity of UE 122. In other words, UE 124 is close enough to UE 122 to begin a discovery process for eventual establishment of D2D CL 125. The logic and/or features at UEs 122 and 124 may also be capable of exchanging discovery packets responsive to the beacon or discovery signal transmission via use of D2D OP zone 412. For these examples, the discovery packets may establish a hierarchical relationship that has UE 124 as an M-UE and UE 122 as an S-UE. Also, in some examples, since uplink-downlink configuration 0 is an LTE-A defined uplink-downlink configuration, LTE-A DL and UL hybrid automatic repeat request (HARQ) timing relationships and channel state information (CSI) feedback mechanisms may be utilized during the exchanging of discovery packets.

Moving to process 6.4 (Establish D2D Communication link), logic and/or features at UE 122 may be capable of establishing D2D CL 125 with UE 124 based on the exchanged discovery packets.

Moving to process 6.5 (D2D Communication), logic and/or features at UE 122 may send a D2D communication to UE 124. According to some examples, the logic and/or features of UE 122 may use D2D OP zone 415 which includes subframes 7-9 allocated as P-UL subframes to send the D2D communication to UE 124 Additional subframes may also be allocated as P-DL subframes for use to receive D2D communications from UE 124. The D2D data communication may be associated with one of a unicast session, a broadcast session or a groupcast session with UE 124 over D2D CL 125. Process 600 may then come to an end.

Figure 7:
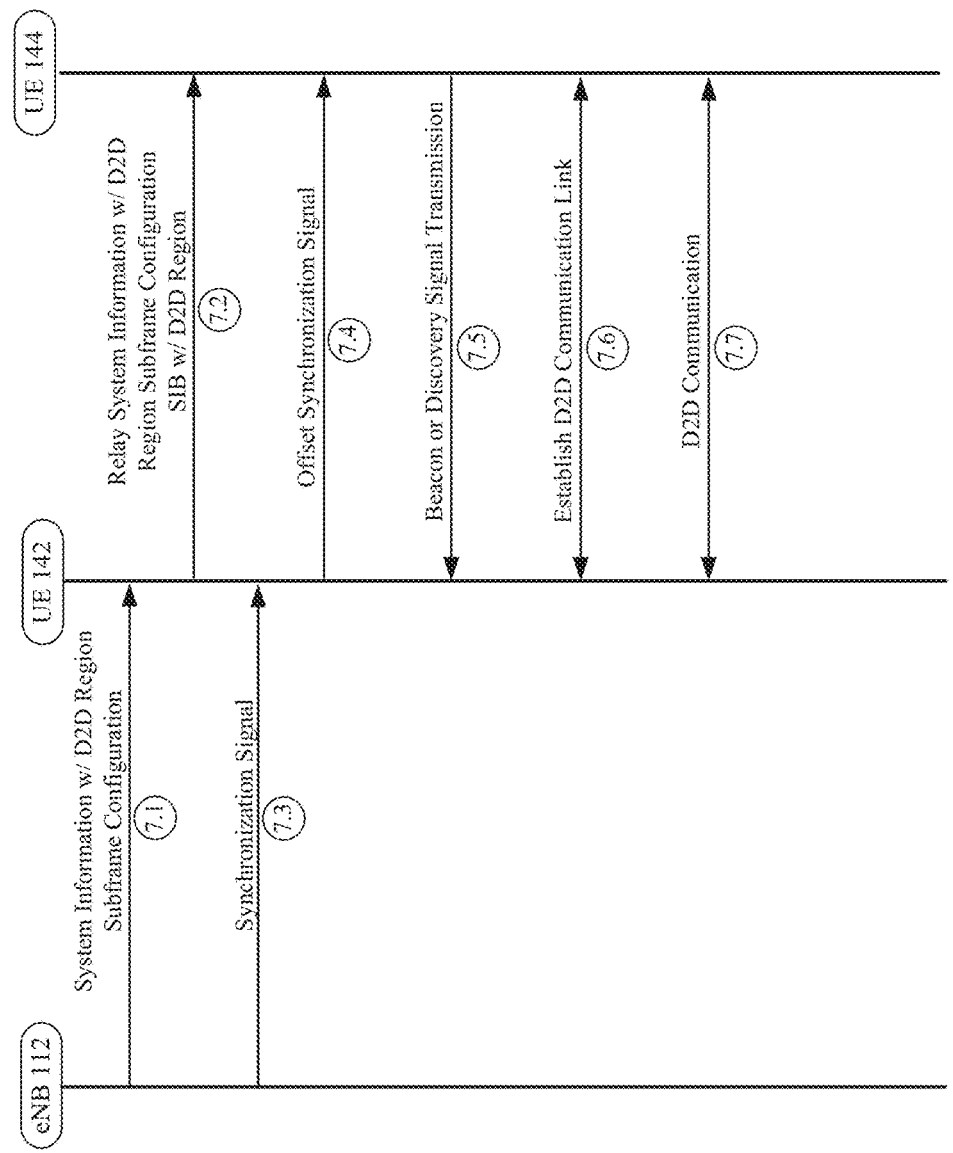
FIG. 7 illustrates an example second process.

FIG. 7 illustrates a second example process. In some examples, as shown in FIG. 7, the second example process includes process 700. Process 700 may be for establishing a D2D CL between UEs for receiving/sending a D2D communication while some UEs are within a coverage area for a WWAN and some are outside of the coverage area. For these examples, elements of system 100 as shown in FIG. 1 such as eNB 112, UE 142 and UE 144 may be used to illustrate example operations related to process 700. Also, uplink-downlink configurations as shown in FIGS. 2-3 along with D2D region subframe configuration shown in FIGS.

4-5 may be used to describe at least parts of process 700. However, the example process 700 is not limited to implementations using elements of system 100, uplink-downlink configurations or D2D region subframe configuration shown in FIGS. 1-5.

Beginning at process 7.1 (System Information w/ D2D region subframe configuration), logic and/or features at UE 142 may be capable of receiving from eNB 112 system information that indicates a D2D region subframe configuration. For example, UE 142 may receive D2D region subframe configuration 400 including D2D region 410 as shown in FIG. 4. UE 142 may receive D2D region subframe configuration 400 via CL 117. D2D region subframe configuration 400, for example, may be received in a SystemInformationBlockType1 message and that message may indicate that uplink-downlink configuration 0 may be used for TDD communications. Also, D2D region subframe configuration 400 as shown in FIG. 4 may include D2D OP zones 411-415 that each include one or more P-DL, P-S or P-UL subframes allocated for synchronization, channel quality measurements/channel quality feedback, proximity sensing/device discovery or data transmission.

Moving to process 7.2 (Relay System Information w/ D2D region subframe configuration), logic and/or features at UE 142 may be capable of relaying the system information w/ D2D region subframe configuration to UE 144.

Moving to process 7.3 (Synchronization Signal), logic and/or features at UE 142 may be capable of receiving a synchronization signal from eNB 112. In some examples, eNB 112 may be serving as a synchronization source for UE 142. For these examples, UE 142 may use the synchronization signal to obtain time and frequency synchronization for use of D2D region 410. The synchronization signal may be received via use of D2D OP zone 411 which includes subframe 0 allocated as a P-DL subframe.

Moving to process 7.4 (Offset Synchronization Signal), logic and/or features at UE 142 may be capable of taking the synchronization signal received from eNB 112 and generate a second synchronization signal that is differentiated from the eNB 112 sent synchronization signal. The second synchronization signal may be differentiated by using an offset in a frequency domain. In some examples logic and/or features at UE 144 may be capable of receiving the offset synchronization signal from UE 142 and use the offset synchronization signal to obtain time and frequency synchronization for use of D2D region 410. For these examples, the synchronization signal may be received via use of D2D OP zone 411. For these examples, the second synchronization signal may be offset rather than relayed to prevent UE 142 from attempting to establish a link with eNB 112 or from being confused by receiving two similar synchronization signals from different synchronization sources.

Moving to process 7.5 (Beacon or Discovery Signal Transmission), logic and/or features at UE 144 may be capable of receiving a beacon or discovery signal transmission from UE 142. In some examples, the beacon or discovery signal transmission may be received via use of D2D OP zone 4124 which includes subframes 1-4 allocated as P-S and P-UL subframes. For these examples, the received beacon or discovery signal transmission may be capable of indicating to the logic and/or features of UE 144 that UE 142 is in proximity of UE 144. In other words, UE 142 is close enough to UE 144 to begin a discovery process for eventual establishment of D2D CL 145. The logic and/or features at these UEs may also use D2D OP zone 412 to exchange discovery packets responsive to the beacon or discovery signal transmission. For these examples, the discovery packets may establish a hierarchical relationship that has UE 124 as an M-UE and UE 144 as an S-UE. Also, in some examples, since uplink-downlink configuration 0 is an LTE-A defined uplink-downlink configuration, LTE-A DL and UL HARQ timing relationships and CSI feedback mechanisms may be utilized during the exchanging of discovery packets.

Moving to process 7.6 (Establish D2D Communication link), logic and/or features at UE 144 may be capable of establishing D2D CL 145 with UE 142 based on the exchanged discovery packets.

Moving to process 7.7 (D2D Communication), logic and/or features at UE 142 may send a D2D communication to UE 144. According to some examples, the logic and/or features of UE 144 may use D2D OP zone 415 which includes subframes 7-9 allocated as P-UL subframes to send the D2D communication to UE 142. Additional subframes may also be allocated as P-DL subframes for use to receive D2D communications from UE 124. The D2D data communication may be associated with one of a unicast session, a broadcast session or a groupcast session with UE 142 over D2D CL 145. Process 700 may then come to an end.

Figure 8:
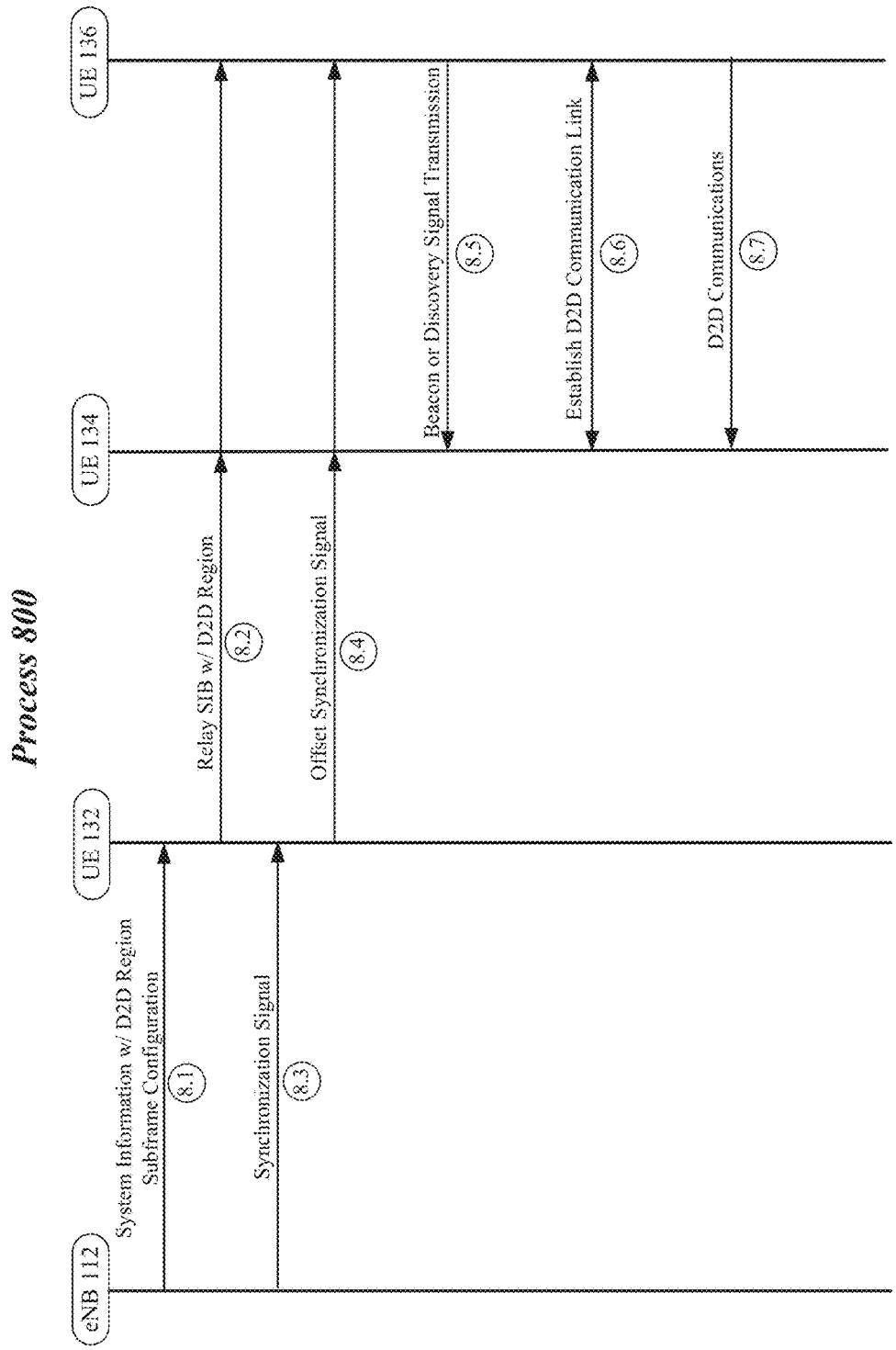
FIG. 8 illustrates an example third process.

FIG. 8 illustrates a third example process. In some examples, as shown in FIG. 8, the third example process includes process 800. Process 800 may be for establishing a D2D CL between UEs for receiving a D2D communication while some UEs are within a coverage area for a WWAN and some are outside of the coverage area. For these examples, elements of system 100 as shown in FIG. 1 such as eNB 112, UE 132, UE 134 and UE 136 may be used to illustrate example operations related to process 800. Also, uplink-downlink configurations as shown in FIGS. 2-3 along with D2D region subframe configuration shown in FIGS. 4-5 may be used to describe at least parts of process 800. However, the example process 800 is not limited to implementations using elements of system 100, uplink-downlink configurations or D2D region subframe configuration shown in FIGS. 1-5.

Beginning at process 8.1 (System Information w/ D2D Region Subframe Configuration), logic and/or features at UE 132 may be capable of receiving from eNB 112 system information that indicates a D2D region subframe configuration. In some examples, UE 132 may receive D2D region subframe configuration 400 including D2D region 410 as shown in FIG. 4 or may receive D2D region subframe configuration 500 as shown in FIG. 5. For example, UE 132 may receive D2D region subframe configuration 500 via CL 115. D2D region subframe configuration 500, for example, may be received via a SystemInformationBlockType1 message and that message may indicate that a modified uplink-downlink configuration 9 may be used for TDD communications. Also, D2D region subframe configuration 500 as shown in FIG. 5, may include D2D OP zones 511, 513 and 515 that each include one or more P-DL subframes allocated for synchronization, proximity sensing/device discovery or data transmission.

Moving to process 8.2 (Relay System Information w/ D2D Region Subframe Configuration), logic and/or features at UE 132 may be capable of relaying the system information w/ D2D region subframe configuration to UEs 134 and 136 via respective CLs 131 and 133.

Moving to process 8.3 (Synchronization Signal), logic and/or features at UE 132 may be capable of receiving a synchronization signal from eNB 112. In some examples, eNB 112 may be serving as a synchronization source for UE 132. For these examples, UE 132 may use the synchronization signal to obtain time and frequency synchronization for use of D2D region 510. The synchronization signal may be received via use of D2D OP zone 511 which includes subframes 0 and 1 allocated as P-DL subframes.

Moving to process 8.4 (Offset Synchronization Signal), logic and/or features at UE 132 may be capable of taking the synchronization signal received from eNB 112 and generate a second synchronization signal that is differentiated from the eNB 112 sent synchronization signal. The second synchronization signal may be differentiated by using an offset in a frequency domain. In some examples logic and/or features at UEs 134 or 136 may be capable of receiving the offset synchronization signal via respective CLs 131 and 133 from UE 132 and use the offset synchronization signal to obtain time and frequency synchronization for use of D2D region 510. For these examples, the synchronization signal may be received via use of D2D OP zone 511. For these examples, the second synchronization signal may be offset rather than relayed to prevent UE 134 or UE 136 from attempting to establish a link with eNB 112 or from being confused by receiving two similar synchronization signals from different synchronization sources.

Moving to process 8.5 (Beacon or Discovery Signal Transmission), logic and/or features at UE 134 may be capable of receiving a beacon or discovery signal transmission from UE 136. In some examples, the beacon or discovery signal transmission may be received via use of D2D OP zone 513 which includes subframes 2-4 allocated as P-DL subframes. For these examples, the received beacon or discovery transmission may be capable of indicating to the logic and/or features of UE 134 that UE 136 is in proximity of UE 134. In other words, UE 134 is close enough to UE 134 to begin a discovery process for eventual establishment of D2D CL 135. The logic and/or features at these UEs may also use D2D OP zone 513 to exchange discovery packets responsive to the beacon or discovery signal transmission. For these examples, the discovery packets may establish a hierarchical relationship that has UE 136 as an M-UE and UE 134 as an S-UE.

Moving to process 8.6 (Establish D2D Communication link), logic and/or features at UE 134 may be capable of establishing D2D CL 135 with UE 136 based on the exchanged discovery packets.

Moving to process 8.7 (D2D Communication), logic and/or features at UE 134 may receive a D2D communication from UE 136. According to some examples, the logic and/or features of UE 134 may use D2D OP zone 515 which includes subframes 5-9 allocated as P-DL subframes to receive the D2D communication from UE 136. For these examples, the D2D data communication may be associated with a broadcast session or a groupcast session with UE 134 over D2D CL 135. Process 800 may then come to an end.

Figure 9:
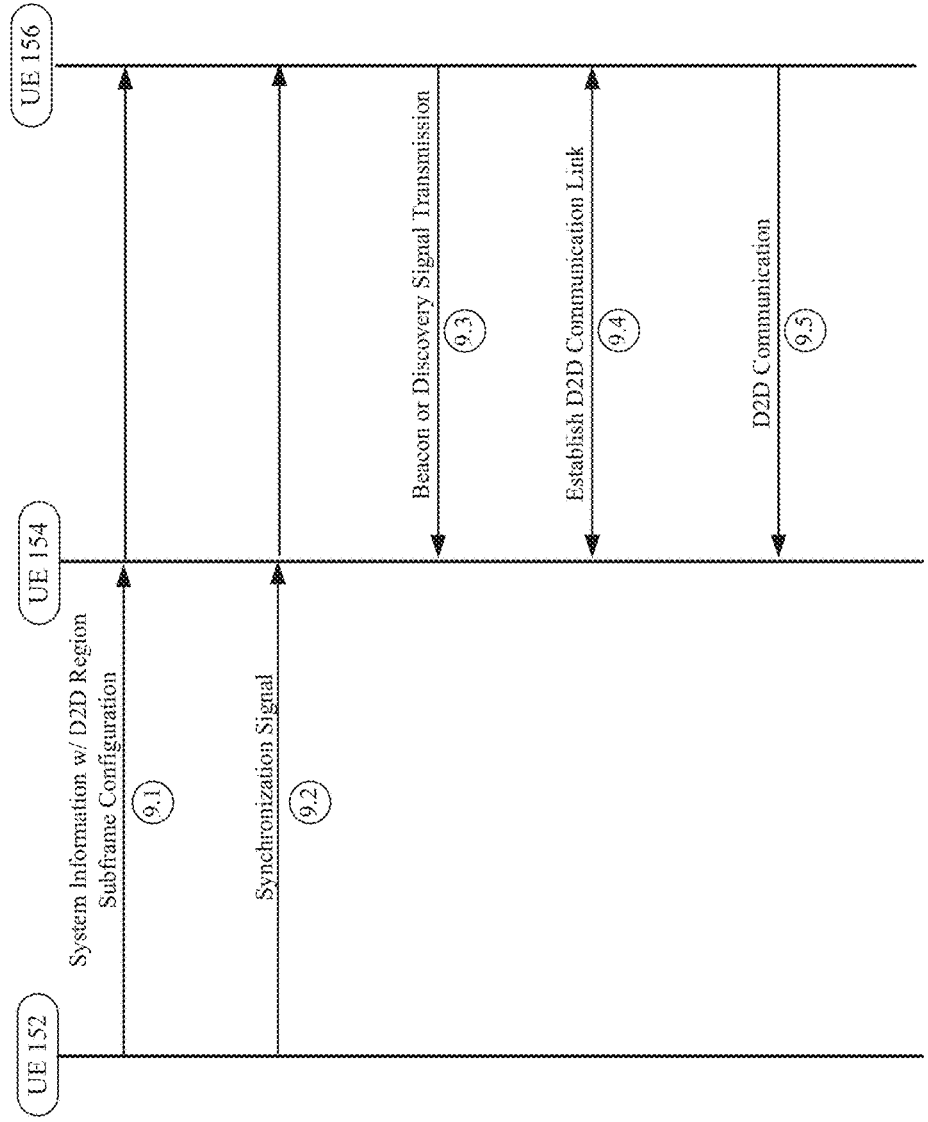
FIG. 9 illustrates an example fourth process.

FIG. 9 illustrates a fourth example process. In some examples, as shown in FIG. 9, the fourth example process includes process 900. Process 900 may be for establishing a D2D CL between UEs for receiving a D2D communication while both UEs are outside a coverage area for a WWAN and a synchronization source UE is also outside the coverage area. For these examples, elements of system 100 as shown in FIG. 1 such as UE 152, UE 154 and UE 156 may be used to illustrate example operations related to process 900. Also, uplink-downlink configurations as shown in FIGS. 2-3 along with D2D region subframe configuration shown in FIGS. 4-5 may be used to describe at least parts of process 900. However, the example process 900 is not limited to implementations using elements of system 100, uplink-downlink configurations or D2D region subframe configuration shown in FIGS. 1-5.

Beginning at process 9.1 (System Information w/ D2D Region Subframe Configuration), logic and/or features at UE 154 and UE 156 may be capable of each receiving from UE 152 system information that indicates a D2D region subframe configuration. For example, UE 154 and UE 156 may receive D2D region subframe configuration 500 including D2D region 510 as shown in FIG. 5. UE 154 may receive D2D region subframe configuration 500 via CL 151 and UE 156 may receive D2D region subframe configuration 500 via CL 153. Both UE 154 and 156 may receive D2D region subframe configuration 500 via use of a dedicated public spectrum (e.g., 700 MHz in the United States). D2D region subframe configuration 500, for example, may be received in a message similar to a SystemInformationBlockType1 message and that message may indicate that uplink-downlink configuration 9 may be used for TDD communications. Also, D2D region subframe configuration 500 as shown in FIG. 5, may include D2D OP zones 511, 513 and 515 that each include one or more P-DL subframes allocated for synchronization, channel quality measurements, channel quality feedback, proximity sensing, device discovery or data transmission.

Moving to process 9.2 (Synchronization Signal), logic and/or features at UE 152 may be capable of generating a synchronization signal. In some examples, UE 152 may be serving as a synchronization source. For these examples logic and/or features at UEs 154 and 156 may be capable of receiving the synchronization signal from UE 152 and use the synchronization signal to obtain time and frequency synchronization for use of D2D region 510. For these examples, the synchronization signal may be received via use of D2D OP zone 511 which includes subframe 0 and 1 allocated as P-DL subframes.

Moving to process 9.3 (Beacon or Discover Signal Transmission), logic and/or features at UE 154 may be capable of receiving a beacon or discovery signal transmission from UE 156. In some examples, the beacon or discovery signal transmission may be received via use of D2D OP zone 513 which includes subframes 2-4 allocated as P-DL subframes. For these examples, the received beacon transmission or discovery signal may be capable of indicating to the logic and/or features of UE 154 that UE 156 is in proximity of UE 154. In other words, UE 156 is close enough to UE 154 to begin a discovery process for eventual establishment of D2D CL 155. The logic and/or features at these UEs may also use D2D OP zone 513 to exchange discovery packets responsive to the beacon or discovery signal transmission. For these examples, the discovery packets may establish a hierarchical relationship that has UE 156 as an M-UE and UE 154 as an S-UE.

Moving to process 9.4 (Establish D2D Communication link), logic and/or features at UE 154 may be capable of establishing D2D CL 155 with UE 156 based on the exchanged discovery packets.

Moving to process 9.5 (D2D Communication), logic and/or features at UE 154 may receive a D2D communication from UE 156. According to some examples, the logic and/or features of UE 154 may use D2D OP zone 515 which includes subframes 5-9 allocated as P-DL subframes to receive the D2D communication from UE 156. For these examples, the D2D data communication may be associated with a broadcast session or a groupcast session with UE 156 over D2D CL 155. Process 900 may then come to an end.

Figure 10:
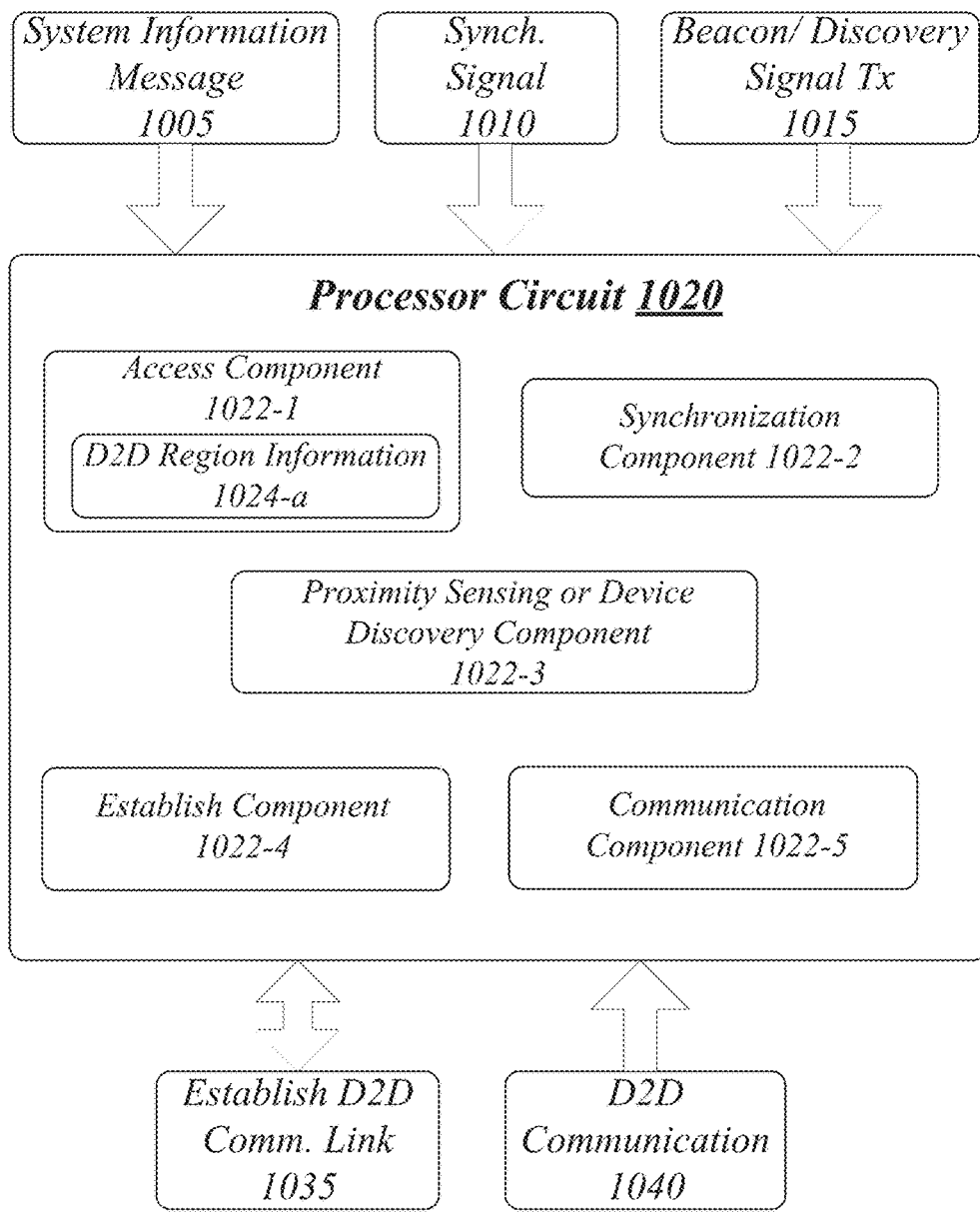
FIG. 10 illustrates an example block diagram for a first apparatus.

FIG. 10 illustrates a block diagram for an example first apparatus. As shown in FIG. 10, the example first apparatus includes apparatus 1000. Although apparatus 1000 shown in FIG. 10 has a limited number of elements in a certain topology, it may be appreciated that the apparatus 1000 may include more or less elements in alternate topologies as desired for a given implementation.

The apparatus 1000 may comprise a computer-implemented apparatus 1000 having a processor circuit 1020 arranged to execute one or more software components 1022-*a*. It is worthy to note that "a" and "b" and "c" and similar designators as used herein are intended to be variables representing any positive integer. Thus, for example, if an implementation sets a value for a=5, then a complete set of software components 1022-*a* may include components 1022-1, 1022-2, 1022-3, 1022-4 and 1022-5. The examples are not limited in this context.

According to some examples, apparatus 1000 may be implemented in user equipment (e.g., UEs 122, 124, 132, 134, 136, 142, 144, 152, 154, 156, 162 or 164) capable of operating in compliance with one or more 3GPP LTE Specifications including LTE-A. For example, apparatus 1000 may be capable of communicatively coupling to an LTE and/or LTE-A compliant WWAN via one or more eNBs. Apparatus 1000 may also be capable of communicatively coupling to one or more UEs via D2D communication links. Apparatus 1000 may also be capable of communicatively coupling to one or more UEs using a dedicated public spectrum when a UE that implements apparatus 1000 is outside a coverage area of the LTE-A compliant WWAN. The examples are not limited in this context.

In some examples, as shown in FIG. 10, apparatus 1000 includes processor circuit 1020. Processor circuit 1020 may be generally arranged to execute one or more software components 1022-*a*. The processing circuit 1020 can be any of various commercially available processors, including without limitation an AMD® Athlon®, Duron® and Opteron® processors; ARM® application, embedded and secure processors; Qualcomm® Snapdragon, IBM® and Motorola® DragonBall® and PowerPC® processors; IBM and Sony® Cell processors; Intel® Celeron®, Core (2) Duo®, Core i3, Core i5, Core i7, Itanium®, Pentium®, Xeon®, Atom®, and XScale® processors; and similar processors. Dual microprocessors, multi-core processors, and other multi-processor architectures may also be employed as processing circuit 1020. According to some examples, processor circuit 1020 may also be an application specific integrated circuit (ASIC) and at least some components 1022-*a* may be implemented as hardware elements of the ASIC.

According to some examples, apparatus 1000 may be implemented by a first UE and may include an access component 1022-1. Access component 1022-1 may be executed by processor circuit 1020 to receive system information that indicates a D2D region that is defined using a set of type 2 frame structure subframes. For these examples, system information message 1005 may include the system information and access component 1022-1 may at least temporarily store information such as D2D region subframe configuration showing D2D OP zones in D2D region information 1024-*a* (e.g., in a lookup table (LUT).

In some examples, apparatus 1000 may also include a synchronization component 1022-2. Synchronization component 1022-2 may be executed by processor circuit 1020 to receive a synchronization signal from a synchronization source to obtain time and frequency synchronization for use of the D2D region to communicate with a second UE. For these examples, synchronization (synch.) signal 1010 may include the received synchronization signal. Synchronization signal 1010 may have been sent by an eNB or another UE such as the second UE.

In some examples, apparatus 1000 may also include a proximity sensing or device discovery component 1022-3. Proximity sensing or device discovery component 1022-3 may be executed by processor circuit 1020 to receive a beacon or discovery signal transmission via use of a first D2D OP zone including an UL or DL subframe(s) allocated for proximity sensing or device discovery. For these examples, beacon/discovery signal transmission (Tx) 1015 may have been transmitted by the second UE and may include the beacon or discovery signal transmission. The beacon or discovery signal transmission may be capable of indicating to proximity sensing or device discovery component 1022-3 that the second UE is in proximity of the first UE that is implementing apparatus 1000. Proximity sensing or device discovery component 1022-3 may also exchange discovery packets with the second UE responsive to beacon/discovery signal Tx 1015.

In some examples, apparatus 1000 may also include an establish component 1022-4. Establish component 1022-4 may be executed by processor circuit 1020 to establish a communication link with the second UE based on the exchanged discovery packets. Establish communication (comm.) link 1035 shown in FIG. 10 shows the establishment of the communication link.

According to some examples, apparatus 1000 may also include a communication component 1022-5. Communication component 1022-5 may be executed by processor circuit 1020 to receive a D2D data communication from the second UE based on use of the D2D region. For these examples, D2D communication 1040 may include the D2D data communication.

Various components of apparatus 1000 and a device implementing apparatus 1000 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 11 illustrates an example of a logic flow 1100. Logic flow 1100 may be representative of some or all of the operations executed by one or more logic, features, or devices described herein, such as apparatus 1100. More particularly, logic flow 1100 may be implemented by access component 1022-1, synchronization component 1022-2 or communication component 1022-5.

In the illustrated example shown in FIG. 11, logic flow 1100 at block 1102 may receive, at a first UE capable of operating in compliance with one or more 3GPP LTE standards including LTE-A, system information that indicates a D2D region that is defined using a set of type 2 frame structure subframes. In some examples, access component 1022-1 may be capable of receiving the system information that indicates the D2D region.

According to some examples, logic flow 1100 at block 1104 may receive a synchronization signal from a synchronization source to obtain time and frequency synchronization for use of the D2D region to communicate with a second UE. For these examples, synchronization component 1022-2 may be capable of receiving the synchronization signal.

In some examples, logic flow 1100 at block 1106 may receive a D2D data communication from the second UE based on use of the D2D region. For these examples, communication component 1022-5 may be capable of receiving the D2D data communication based on use of the D2D region.

FIG. 12 illustrates an embodiment of a storage medium 1200. The storage medium 1200 may comprise an article of manufacture. In some examples, storage medium 1200 may include any non-transitory computer readable medium or machine readable medium, such as an optical, magnetic or semiconductor storage. Storage medium 1200 may store various types of computer executable instructions, such as instructions to implement logic flow 1100. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 13:
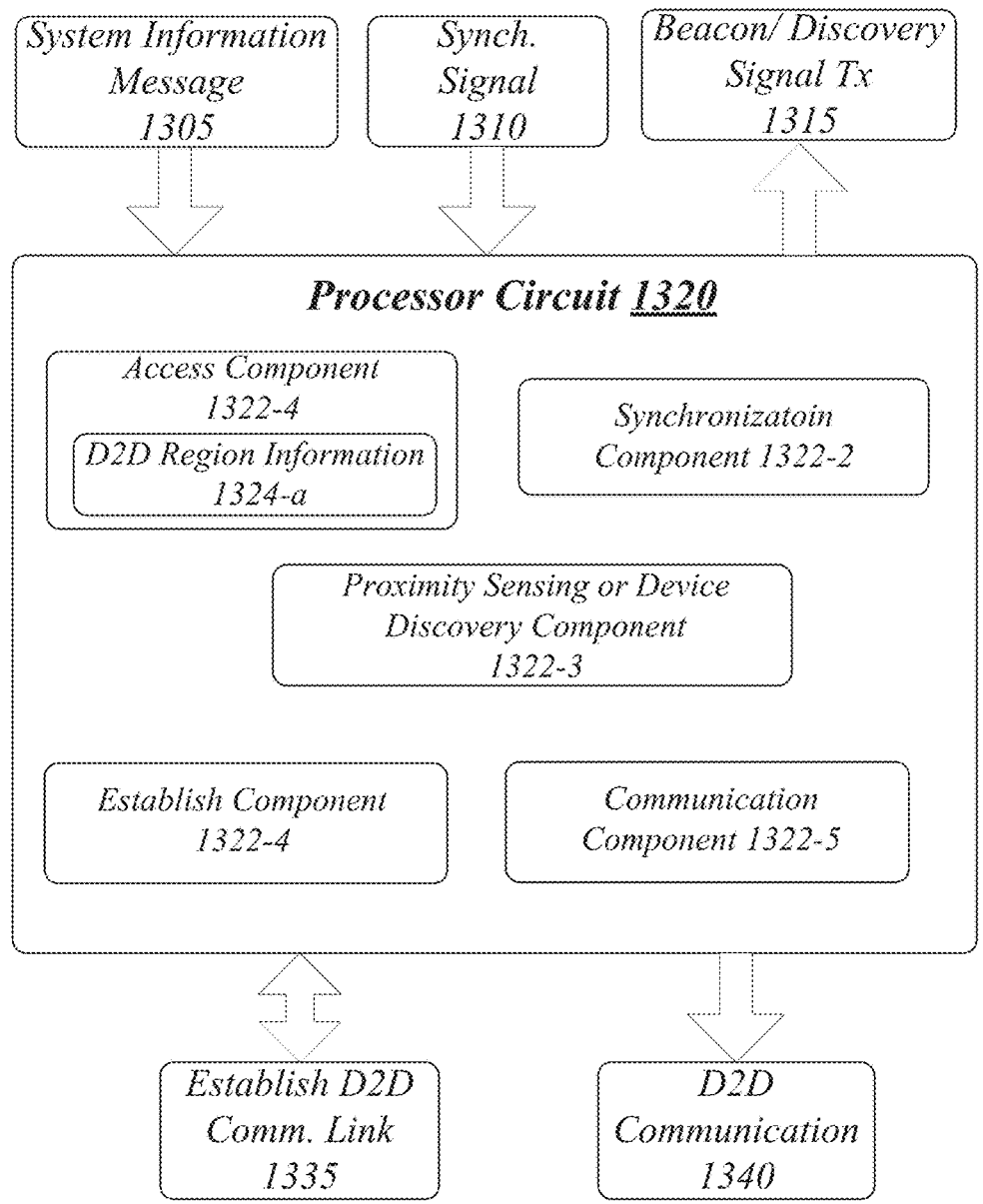
FIG. 13 illustrates an example block diagram for a second apparatus.

FIG. 13 illustrates a block diagram for an example second apparatus. As shown in FIG. 13, the example second apparatus includes apparatus 1300. Although apparatus 1300 shown in FIG. 13 has a limited number of elements in a certain topology, it may be appreciated that the apparatus 1300 may include more or less elements in alternate topologies as desired for a given implementation.

The apparatus 1300 may comprise a computer-implemented apparatus 1300 having a processor circuit 1320 arranged to execute one or more software components 1322-a. It is worthy to note that "a" and "b" and "c" and similar designators as used herein are intended to be variables representing any positive integer. Thus, for example, if an implementation sets a value for a=5, then a complete set of software components 1322-a may include components 1322-1, 1322-2, 1322-3, 1322-4 and 1322-5. The examples are not limited in this context.

According to some examples, apparatus 1300 may be implemented in user equipment (e.g., UEs 122, 124, 132, 134, 136, 142, 144, 152, 154, 156, 162 or 164) capable of operating in compliance with one or more 3GPP LTE Specifications including LTE-A. For example, apparatus 1300 may be capable of communicatively coupling to an LTE and/or LTE-A compliant WWAN via one or more eNBs. Apparatus 1300 may also be capable of communicatively coupling to one or more UEs via D2D communication links. Apparatus 1300 may also be capable of communicatively coupling to one or more UEs using a dedicated public spectrum when a UE that implements apparatus 1000 is outside a coverage area of the LTE-A compliant WWAN. The examples are not limited in this context.

In some examples, as shown in FIG. 13, apparatus 1300 includes processor circuit 1320. Processor circuit 1320 may be generally arranged to execute one or more software components 1322-a. The processing circuit 1320 can be any of various commercially available processors to include but not limited to the processors mentioned above for apparatus 1300. Also, according to some examples, processor circuit 1320 may also be an ASIC and at least some components 1322-a may be implemented as hardware elements of the ASIC.

According to some examples, apparatus 1300 may be implemented by a first UE and may include an access component 1322-1. Access component 1322-1 may be executed by processor circuit 1320 to receive system information that indicates a D2D region that is defined using a set of type 2 frame structure subframes. For these examples, system information message 1305 may include the system information and access component 1322-1 may at least temporarily store information such as D2D region subframe configurations showing D2D OP zones in D2D region information 1324-a (e.g., in a LUT).

In some examples, apparatus 1300 may also include a synchronization component 1322-2. Synchronization component 1322-2 may be executed by processor circuit 1320 to receive a synchronization signal from a synchronization source to obtain time and frequency synchronization for use of the D2D region to communicate with a second UE. For these examples, synchronization (synch.) signal 1310 may include the received synchronization signal. Synchronization signal 1310 may have been sent by an eNB or another UE such as the second UE.

In some examples, apparatus 1300 may also include a proximity sensing or device discovery component 1322-3. Proximity sensing or device discovery component 1322-3 may be executed by processor circuit 1320 to transmit a beacon or discovery signal via use of a first D2D OP zone including a DL or UL subframes allocated as P-DL or P-UL subframes for proximity sensing or device discovery. For these examples, beacon/discovery signal transmission (Tx) 1315 may include the beacon or discovery signal transmitted to the second UE. The beacon or discovery transmission may be capable of indicating to the second UE that the first UE is in proximity of the second UE. Proximity sensing or device discovery component 1322-3 may also exchange discovery packets with the second UE responsive to beacon/discovery signal Tx 1315.

In some examples, apparatus 1300 may also include an establish component 1322-4. Establish component 1322-4 may be executed by processor circuit 1320 to establish a communication link with the second UE based on the exchanged discovery packets. Establish communication (comm.) link 1335 shown in FIG. 13 shows the establishment of the communication link.

According to some examples, apparatus 1300 may also include a communication component 1322-5. Communication component 1322-5 may be executed by processor circuit 1320 to send a D2D data communication to the second UE based on use of the D2D region. For these examples, D2D communication 1340 may include the D2D data communication sent to the second UE.

Various components of apparatus 1300 and a device implementing apparatus 1300 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

FIG. 14 illustrates an example of a logic flow 1400. Logic flow 1400 may be representative of some or all of the operations executed by one or more logic, features, or devices described herein, such as apparatus 1300. More particularly, logic flow 1400 may be implemented by access component 1322-1, synchronization component 1322-2 or communication component 1322-6.

In the illustrated example shown in FIG. 14, logic flow 1400 at block 1402 may receive, at a first UE capable of operating in compliance with one or more 3GPP LTE standards including LTE-A, system information that indicates a D2D region that is defined using a set of type 2 frame structure subframes. In some examples, access component 1022-1 may be capable of receiving the system information that indicates the D2D region.

According to some examples, logic flow 1400 at block 1404 may receive a synchronization signal from a synchronization source to obtain time and frequency synchronization for use of the D2D region to communicate with a second UE. For these examples, synchronization component 1322-2 may be capable of receiving the synchronization signal.

In some examples, logic flow 1400 at block 1406 may receive a D2D data communication from the second UE based on use of the D2D region. For these examples, communication component 1322-5 may be capable of sending the D2D data communication based on use of the D2D region.

FIG. 15 illustrates an embodiment of a storage medium 1500. The storage medium 1500 may comprise an article of manufacture. In some examples, storage medium 1500 may include any non-transitory computer readable medium or machine readable medium, such as an optical, magnetic or semiconductor storage. Storage medium 1500 may store various types of computer executable instructions, such as instructions to implement logic flow 1400. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 16:
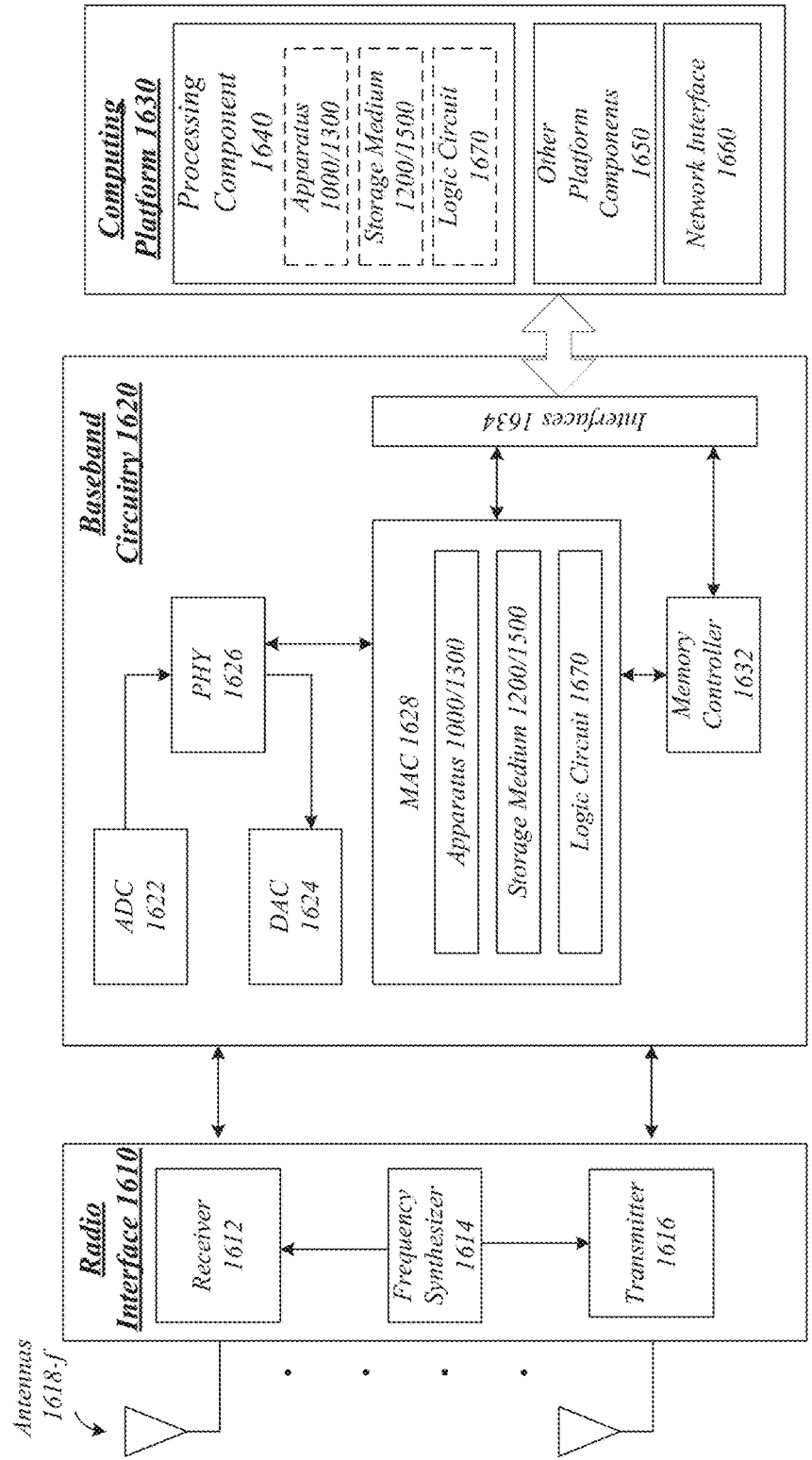
FIG. 16 illustrates an example of a device.

FIG. 16 illustrates an embodiment of a device 1600 for use in a broadband wireless access network. Device 1600 may implement, for example, apparatus 1000/1300, storage medium 1200/1500 and/or a logic circuit 1670. The logic circuit 1670 may include physical circuits to perform operations described for apparatus 1000/1300. As shown in FIG. 16, device 1600 may include a radio interface 1610, baseband circuitry 1620, and computing platform 1630, although examples are not limited to this configuration.

The device 1600 may implement some or all of the structure and/or operations for the apparatus 1000/1300, storage medium 1200/1500 and/or logic circuit 1670 in a single computing entity, such as entirely within a single device. Alternatively, the device 1600 may distribute portions of the structure and/or operations for apparatus 1000/1300, storage medium 1200/1500 and/or logic circuit 1670 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The examples are not limited in this context.

In one embodiment, radio interface 1610 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM) symbols) although the embodiments are not limited to any specific over-the-air interface or modulation scheme. Radio interface 1610 may include, for example, a receiver 1612, a transmitter 1616 and/or a frequency synthesizer 1614. Radio interface 1610 may include bias controls, a crystal oscillator and/or one or more antennas 1618-*f*. In another embodiment, radio interface 1610 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1620 may communicate with radio interface 1610 to process receive and/or transmit signals and may include, for example, an analog-to-digital converter 1622 for down converting received signals, a digital-to-analog converter 1624 for up converting signals for transmission. Further, baseband circuitry 1620 may include a baseband or physical layer (PHY) processing circuit 1626 for PHY link layer processing of respective receive/transmit signals. Baseband circuitry 1620 may include, for example, a processing circuit 1628 for medium access control (MAC)/data link layer processing. Baseband circuitry 1620 may include a memory controller 1632 for communicating with MAC processing circuit 1628 and/or a computing platform 1630, for example, via one or more interfaces 1634.

In some embodiments, PHY processing circuit 1626 may include a frame construction and/or detection module, in combination with additional circuitry such as a buffer memory, to construct and/or deconstruct communication frames (e.g., containing subframes). Alternatively or in addition, MAC processing circuit 1628 may share processing for certain of these functions or perform these processes independent of PHY processing circuit 1626. In some embodiments, MAC and PHY processing may be integrated into a single circuit.

Computing platform 1630 may provide computing functionality for device 1600. As shown, computing platform 1630 may include a processing component 1640. In addition to, or alternatively of, baseband circuitry 1620 of device 1600 may execute processing operations or logic for apparatus 1000/1300, storage medium 1200/1500, and logic circuit 1670 using the processing component 1630. Processing component 1640 (and/or PHY 1626 and/or MAC 1628)

may comprise various hardware elements, software elements, or a combination of both. Examples of hardware elements may include devices, logic devices, components, processors, microprocessors, circuits, processor circuits (e.g., processor circuit 1020 or 1320), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 1630 may further include other platform components 1650. Other platform components 1650 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 1630 may further include a network interface 1660. In some examples, network interface 1660 may include logic and/or features to support wireless network interfaces as described in one or more 3GPP LTE or LTE-A specifications or standards. For these examples, network interface 1660 may enable an apparatus 1000 or 1300 located at an UE to communicatively couple to a WWAN or use a publically dedicated spectrum.

Device 1600 may be, for example, user equipment, a computer, a personal computer (PC), a desktop computer, a laptop computer, an ultrabook computer, a smartphone, a tablet computer, a notebook computer, a netbook computer, a work station, a mini-computer, multiprocessor system, processor-based system, wireless access point, or combination thereof. Accordingly, functions and/or specific configurations of device 1600 described herein, may be included or omitted in various embodiments of device 1600, as suitably desired. In some embodiments, device 1600 may be configured to be compatible with protocols and frequencies associated one or more of the 3GPP LTE Specifications and/or IEEE 802.16 Standards for WMANs, and/or other broadband wireless networks, cited herein, although the examples are not limited in this respect.

Embodiments of device 1600 may be implemented using single input single output (SISO) architectures. However, certain implementations may include multiple antennas (e.g., antennas 1618-*f*) for transmission and/or reception using adaptive antenna techniques for beamforming or spatial division multiple access (SDMA) and/or using multiple input multiple output (MIMO) communication techniques.

The components and features of device 1600 may be implemented using any combination of discrete circuitry, application specific integrated circuits (ASICs), logic gates and/or single chip architectures. Further, the features of device 1600 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1600 shown in the block diagram of FIG. 16 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in examples.

Figure 17:
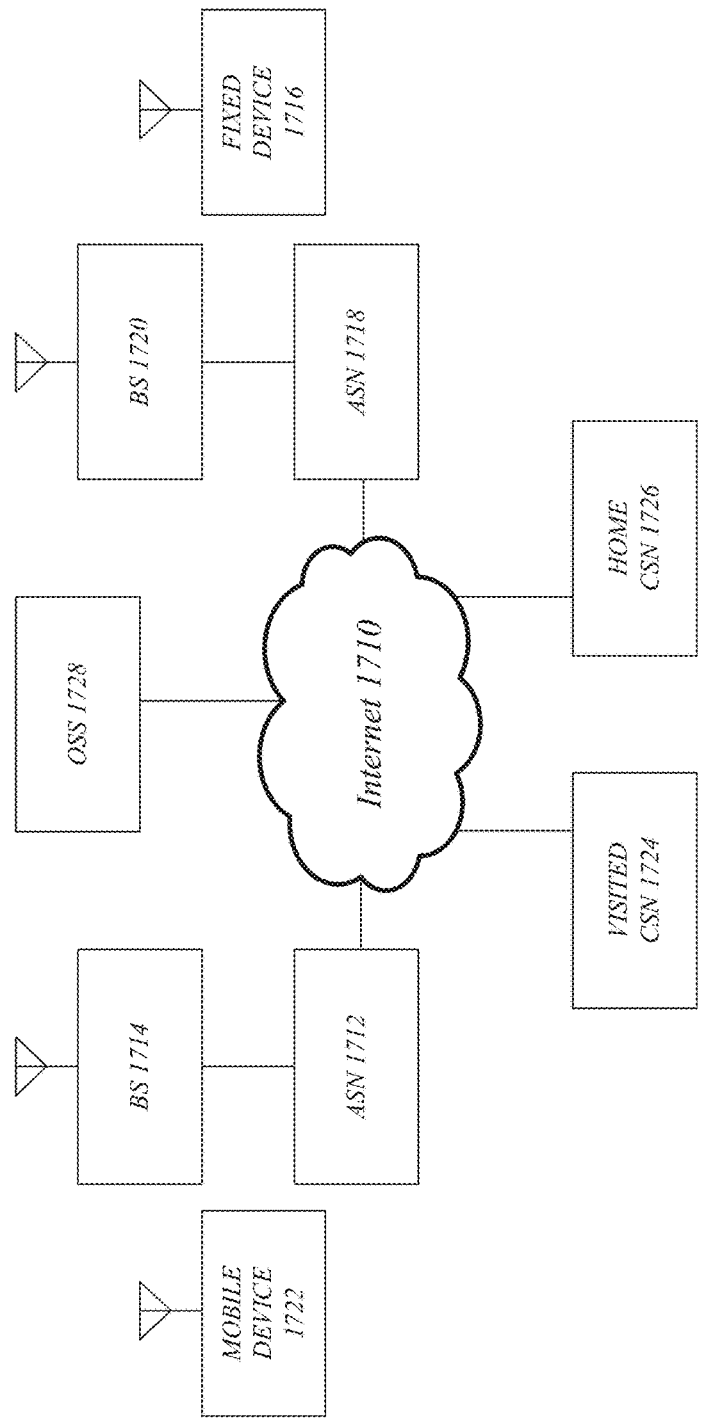
FIG. 17 illustrates an example of a broadband wireless access system.

FIG. 17 illustrates an embodiment of a broadband wireless access system 1700. As shown in FIG. 17, broadband wireless access system 1700 may be an internet protocol (IP) type network comprising an internet 1710 type network or the like that is capable of supporting mobile wireless access and/or fixed wireless access to internet 1710. In one or more embodiments, broadband wireless access system 1700 may comprise any type of orthogonal frequency division multiple access (OFDMA) and/or multiple single carrier frequency division multiple access (multiple SC-FDMA) based wireless network, such as a system compliant with one or more of the 3GPP LTE Specifications and/or IEEE 802.16 Standards, and the scope of this disclosure is not limited in these respects.

In the exemplary broadband wireless access system 1700, access service networks (ASN) 1714, 1718 are capable of coupling with base stations (BS) 1714, 1720 (RRHs or eNBs), respectively, to provide wireless communication between one or more fixed devices 1716 and internet 1710, or one or more mobile devices 1722 and Internet 1710. One example of a fixed device 1716 and a mobile device 1722 is UE 122, with the fixed device 1716 comprising a stationary version of UE 122 and the mobile device 1722 comprising a mobile version of UE 122. ASN 1712 may implement profiles that are capable of defining the mapping of network functions to one or more physical entities on broadband wireless access system 1700. Base stations 1714, 1720 (or eNBs) may comprise radio equipment to provide RF communication with fixed device 1716 and mobile device 1722, such as described with reference to device 1700, and may comprise, for example, the PHY, MAC, RLC or PDCP layer equipment in compliance with a 3GPP LTE Specification or an IEEE 802.16 Standard. Base stations 1714, 1720 (or eNBs) may further comprise an IP backplane to couple to Internet 1710 via ASN 1712, 1718, respectively, although the scope of the claimed subject matter is not limited in these respects.

Broadband wireless access system 1700 may further comprise a visited connectivity service network (CSN) 1724 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CSN 1724 or home CSN 1726, and the scope of the claimed subject matter is not limited in these respects. Visited CSN 1724 may be referred to as a visited CSN in the case where visited CSN 1724 is not part of the regular service provider of fixed device 1716 or mobile device 1722, for example where fixed 1716 or mobile device 1722 is roaming away from their respective home CSN 1726, or where broadband wireless access system 1700 is part of the regular service provider of fixed device 1716 or mobile device 1722 but where broadband wireless access system 1700 may be in another location or state that is not the main or home location of fixed device 1716 or mobile device 1722.

Fixed device 1716 may be located anywhere within range of one or both base stations 1714, 1720, such as in or near a home or business to provide home or business customer broadband access to Internet 1710 via base stations 1714, 1720 and ASN 1712, 1718, respectively, and home CSN 1726. It is worthy to note that although fixed device 1716 is generally disposed in a stationary location, it may be moved to different locations as needed. Mobile device 1722 may be utilized at one or more locations if mobile device 1722 is within range of one or both base stations 1714, 1720, for example.

In accordance with one or more embodiments, operation support system (OSS) 1728 may be part of broadband wireless access system 1700 to provide management functions for broadband wireless access system 1700 and to provide interfaces between functional entities of broadband wireless access system 1700. Broadband wireless access system 1700 of FIG. 17 is merely one type of wireless network showing a certain number of the components of broadband wireless access system 1700, and the scope of the claimed subject matter is not limited in these respects.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

Example 1

An Example apparatus for D2D communications may include a processor circuit for a first user equipment (UE) capable of operating in compliance with one or more $3^{rd}$ Generation Partnership Project (3GPP) Long Term Evolution (LTE) standards including LTE-Advanced (LTE-A). The example apparatus may also include an access component for execution by the processor circuit to receive system information that indicates a D2D region that is defined using a set of type 2 frame structure subframes. The example apparatus may also include a synchronization component for execution by the processor circuit to receive a synchronization signal from a synchronization source to obtain time and frequency synchronization for use of the D2D region to communicate with a second UE. The example apparatus may also include a communication component for execution by the processor circuit to receive a D2D data communication from the second UE based on use of the D2D region.

Example 2

The Example apparatus of example 1, the D2D region may be based on a given uplink-downlink configuration from among uplink-downlink configurations as defined by LTE-A for time-division duplex (TDD), with D2D signals received from the second UE during an uplink subframe allocated as a proximity uplink (P-UL) subframe.

Example 3

The Example apparatus of example 1, the D2D region may be based on an uplink-downlink configuration that modifies at least some uplink or downlink subframes for one or more uplink-downlink configurations as defined by LTE-A for time-division duplex (TDD), with D2D signals received from the second UE during a downlink subframe allocated as a proximity downlink (P-DL) subframe.

Example 4

The Example apparatus of example 3, the at least some uplink or downlink subframes may be modified responsive to a load balancing condition between at least the first and second UEs or responsive to interference management between at least the first and second UEs.

Example 5

The Example apparatus of example 1, the set of type 2 frame structure subframes may be arranged in a plurality of subsets. For this example, each subset may be allocated to one of a plurality of D2D operational zones.

Example 6

The Example apparatus of example 5, the plurality of D2D operational zones may each include one or more proximity downlink (P-DL), proximity uplink (P-UL) or proximity special (P-S) subframes allocated for synchronization, channel quality measurements and feedback, proximity sensing of other UEs, transmission of control information, device discovery or data transmission.

Example 7

The Example apparatus of example 6 also including a proximity sensing or device discovery component for execution by the processor circuit to receive or transmit a beacon transmission or discovery signal via use of a first D2D operational zone including a P-DL subframe allocated for proximity sensing or device discovery. The beacon or discovery signal transmission may be capable of indicating to the proximity sensing or device discovery component that the second UE is in proximity of the first UE. The example apparatus of example 6 also including an establish component for execution by the processor circuit to establish a communication link with the second UE based on exchanged discovery packets via allocated P-DL subframes. The example apparatus of example 6 also including the communication component to use a third D2D operational zone including P-UL, P-S or P-DL subframes allocated for data transmission to receive the D2D data communication from the second UE.

Example 8

The Example apparatus of example 7, the D2D data communication may be associated with one of a unicast session, a broadcast session or a groupcast session with the second UE over the communication link.

Example 9

The Example apparatus of example 1, the first UE may be located within a coverage area of a wireless wide area network (WWAN) capable of operating in compliance with one or more 3GPP LTE standards including LTE-A. For this example, the synchronization source may include an evolved node B (eNB) for the WWAN.

Example 10

The Example apparatus of example 9, the eNB may be capable of determining and indicating via SIB signaling to the first and second UEs the D2D region that is defined using the set of type 2 frame structure subframes.

Example 11

The Example apparatus of example 1, the second UE may be located within a coverage area of a wireless wide area network (WWAN) capable of operating in compliance with one or more 3GPP LTE standards including LTE-A and the first UE located outside the coverage area of the WWAN. For this example, the synchronization source may include the second UE. The second UE may be capable of relaying the system information relevant for D2D operations from the WWAN to the first UE.

Example 12

The Example apparatus of example 1, the first and second UEs may be located outside a coverage area of a wireless wide area network (WWAN) capable of operating in compliance with one or more 3GPP LTE standards including LTE-A. For this example, the synchronization source including a third UE located within the WWAN. The third UE may be capable of transmitting the synchronization signal to the first and second UEs. The third UE may also be capable of relaying the system information relevant for D2D operations to the first and second UEs.

Example 13

The Example apparatus of example 1, the first and second UEs may be located outside a coverage area of a wireless wide area network (WWAN) capable of operating in compliance with one or more 3GPP LTE standards including LTE-A. For this example, the first and second UEs may be capable of communicating using a dedicated public safety spectrum, the synchronization source including the second UE.

Example 14

The Example apparatus of example 13, the access component may receive the system information relevant for D2D operations from the second UE.

Example 15

The Example apparatus of example 1 may also include a digital display coupled to the processor circuit to present a user interface view.

Example 16

An Example method for D2 communications may include receiving, at a first user equipment (UE) capable of operating in compliance with one or more $3^{rd}$ Generation Partnership Project (3GPP) Long Term Evolution (LTE) standards including LTE-Advanced (LTE-A), a system information that indicates a D2D region that is defined using a set of type 2 frame structure subframes. The example method may also include receiving a synchronization signal from a synchronization source to obtain time and frequency synchronization for use of the D2D region to communicate with a second UE. The example method may also include receiving a D2D data communication from the second UE based on use of the D2D region.

Example 17

The Example method of example 16, the D2D region may be based on a given uplink-downlink configuration from among uplink-downlink configurations as defined by LTE-A for time-division duplex (TDD), with D2D signals received from the second UE during an uplink subframe allocated as a proximity uplink (P-UL) subframe.

Example 18

The Example method of example 16, the D2D region may be based on an uplink-downlink configuration that modifies at least some uplink or downlink subframes for one or more uplink-downlink configurations as defined by LTE-A for time-division duplex (TDD), with D2D signals received from the second UE during a downlink subframe allocated as a proximity downlink (P-DL) subframe.

Example 19

The Example method of example 18, the at least some uplink or downlink subframes may be modified responsive to a load balancing condition between at least the first and second UEs or responsive to interference management between at least the first and second UEs.

Example 20

The Example method of example 16, the set of type 2 frame structure subframes may be arranged in a plurality of subsets. For this example, each subset may be allocated to one of a plurality of D2D operational zones.

Example 21

The Example method of example 19, the plurality of D2D operational zones may each include one or more proximity downlink (P-DL), proximity uplink (P-UL) or proximity special (P-S) subframes allocated for synchronization, channel quality measurements and feedback, proximity sensing of other UEs, transmission of control information, device discovery or data transmission.

Example 22

The Example method of example 21 may also include receiving a beacon transmission or discovery signal via use of a first D2D operational zone including a P-UL subframe allocated for proximity sensing or device discovery. The beacon or discovery signal transmission may be capable of indicating that the second UE is in proximity of the first UE. The example method of example 21 may also include establishing a communication link with the second UE based on exchanged discovery packets and use a third D2D operational zone including P-UL, P-S or P-DL subframes allocated for data transmission to receive the D2D data communication from the second UE.

Example 23

The Example method of example 22, the D2D data communication associated with one of a unicast session, a broadcast session or a groupcast session with the second UE over the communication link.

Example 23

The Example method of example 16, the first UE may be located within a coverage area of a wireless wide area network (WWAN) capable of operating in compliance with one or more 3GPP LTE standards including LTE-A. For this example, the synchronization source may include an evolved node B (eNB) for the WWAN.

Example 24

The Example method of example 23, the eNB may be capable of determining and indicating via SIB signaling to the first and second UEs the D2D region that is defined using the set of type 2 frame structure subframes.

Example 26

The Example method of example 16, the second UE may be located within a coverage area of a wireless wide area network (WWAN) capable of operating in compliance with one or more 3GPP LTE standards including LTE-A and the first UE located outside the coverage area of the WWAN. For this example, the synchronization source may include the second UE. The second UE may be capable of relaying the system information relevant for D2D operations from the WWAN to the first UE.

Example 27

The Example method of example 16, the first and second UEs may be located outside a coverage area of a wireless wide area network (WWAN) capable of operating in compliance with one or more 3GPP LTE standards including LTE-A. For this example, the synchronization source may include a third UE located within the coverage area. The third UE may be capable of transmitting the synchronization signal to the first and second UEs. The third UE may also be capable of relaying the system information relevant for D2D operations to the first and second UEs.

Example 28

The Example method of example 16, the first and second UEs may be located outside a coverage area of a wireless wide area network (WWAN) capable of operating in compliance with one or more 3GPP LTE standards including LTE-A. For this example, the first and second UEs may be capable of communicating using a dedicated public safety spectrum, the synchronization source including the second UE.

Example 29

The Example method of example 28, the system information may be received from the second UE.

Example 30

At least one machine readable medium may include a plurality of instructions that in response to being executed on a system at user equipment (UE) may cause the system to carry out an example method according to any one of examples 16 to 29.

Example 31

An apparatus may include means for performing the example methods of any one of examples 16 to 29.

Example 32

An Example at least one machine readable medium including a plurality of instructions that in response to being executed on a system for a first user equipment (UE) capable of operating in compliance with one or more or more $3^{rd}$ Generation Partnership Project (3GPP) Long Term Evolution (LTE) standards including LTE-Advanced (LTE-A) may cause the system to receive system information that indicates a device-to-device (D2D) region that is defined using a set of type 2 frame structure subframes. The instructions may also cause the system to receive a synchronization signal from a synchronization source to obtain time and frequency synchronization for use of the D2D region to communicate with a second UE. The instructions may also cause the system to receive a D2D data communication from the second UE based on use of the D2D region.

Example 33

The Example at least one machine readable medium of example 32, the D2D region may be based on a given uplink-downlink configuration from among uplink-downlink configurations as defined by LTE-A for time-division duplex (TDD), with D2D signals received from the second UE during an uplink subframe allocated as a proximity uplink (P-UL) subframe.

Example 34

The Example at least one machine readable medium of example 32, the D2D region may be based on an uplink-downlink configuration that modifies at least some uplink or downlink subframes for one or more uplink-downlink configurations as defined by LTE-A for time-division duplex (TDD), with D2D signals received from the second UE during a downlink subframe allocated as a proximity downlink (P-DL) subframe.

Example 35

The Example at least one machine readable medium of example 34, the at least some uplink or downlink subframes may be modified responsive to a load balancing condition between at least the first and second UEs or responsive to interference management between at least the first and second UEs.

Example 36

The Example at least one machine readable medium of example 32, the set of type 2 frame structure subframes may be arranged in a plurality of subsets. For this example, each subset may be allocated to one of a plurality of D2D operational zones.

Example 37

The Example at least one machine readable medium of example 36, the plurality of D2D operational zones may each include one or more subframes allocated for synchronization, channel quality measurements, proximity sensing of other UEs, device discovery or data transmission.

Example 38

The Example at least one machine readable medium of example 37, the instructions may further cause the system to receive a beacon transmission or discovery signal via use of a first D2D operational zone including a P-UL subframe allocated for proximity sensing or device discovery. The beacon or discovery signal transmission may be capable of indicating that the second UE is in proximity of the first UE. The instructions may further cause the system to establish a communication link with the second UE based on exchanged discovery packets and use a third D2D operational zone including P-UL, P-S or P-DL subframes allocated for data transmission to receive the D2D data communication from the second UE.

Example 39

The Example at least one machine readable medium of example 38, the D2D data communication may be associated with one of a unicast session, a broadcast session or a groupcast session with the second UE over the communication link.

Example 40

The Example at least one machine readable medium of example 32, the first UE may be located within a coverage area of a wireless wide area network (WWAN) capable of operating in compliance with one or more 3GPP LTE standards including LTE-A. For this example, the synchronization source including an evolved node B (eNB) for the WWAN.

Example 41

The Example at least one machine readable medium of example 40, the eNB may be capable of determining and indicating via SIB signaling to the first and second UEs the D2D region that is defined using the set of type 2 frame structure subframes.

Example 42

The Example at least one machine readable medium of example 32, the second UE may be located within a coverage area of a wireless wide area network (WWAN) capable of operating in compliance with one or more 3GPP LTE standards including LTE-A and the first UE may be located outside the coverage area of the WWAN. For this example, the synchronization source may include the second UE. The second UE may be capable of relaying the system information relevant for D2D operations from the WWAN to the first UE.

Example 43

The Example at least one machine readable medium of example 32, the first and second UEs may be located outside a coverage area of a wireless wide area network (WWAN) capable of operating in compliance with one or more 3GPP LTE standards including LTE-A. For this example, the synchronization source may include a third UE located within the coverage area. The third UE may be capable of transmitting the synchronization signal to the first and second UEs. The third UE may also be capable of relaying the system information relevant for D2D operations to the first and second UEs.

Example 44

The Example at least one machine readable medium of example 32, the first and second UEs may be located outside a coverage area of a wireless wide area network (WWAN) capable of operating in compliance with one or more 3GPP LTE standards including LTE-A. For this example, the first and second UEs may be capable of communicating using a dedicated public safety spectrum and the synchronization source may include the second UE.

Example 45

The Example at least one machine readable medium of example 44, the system information may be received from the second UE.

Example 46

An Example apparatus for D2D communications may include a processor circuit for a first user equipment (UE) capable of operating in compliance with one or more $3^{rd}$ Generation Partnership Project (3GPP) Long Term Evolution (LTE) standards including LTE-Advanced (LTE-A). The example apparatus may also include an access component for execution by the processor circuit to receive system information that indicates a D2D region that is defined using a set of type 2 frame structure subframes. The example apparatus may also include a synchronization component for execution by the processor circuit to receive a synchronization signal from a synchronization source to obtain time and frequency synchronization for use of the D2D region to communicate with a second UE. The example apparatus may also include a communication component for execution by the processor circuit to send a D2D data communication to the second UE based on use of the D2D region.

Example 47

The Example apparatus of example 46, the D2D region may be based on a given uplink-downlink configuration from among uplink-downlink configurations as defined by LTE-A for time-division duplex (TDD), with D2D signals received from the second UE during an uplink subframe allocated as a proximity uplink (P-UL) subframe.

Example 48

The Example apparatus of example 46, the D2D region may be based on an uplink-downlink configuration that modifies at least some uplink or downlink subframes for one or more uplink-downlink configurations as defined by LTE-A for time-division duplex (TDD), with D2D signals sent to the second UE during an uplink subframe allocated as a proximity downlink (P-DL) subframe for sending data transmission to other UEs.

Example 49

The Example apparatus of example 48, the at least some uplink or downlink subframes may be modified responsive to a load balancing condition between at least the first and second UEs or responsive to interference management between at least the first and second UEs.

Example 50

The Example apparatus of example 49, the set of type 2 frame structure subframes may be arranged in a plurality of subsets. For this example, each subset allocated to one of a plurality of D2D operational zones.

Example 51

The Example apparatus of example 50, the plurality of D2D operational zones each including one or more proximity downlink (P-DL), proximity uplink (P-UL) or proximity special (P-S) subframes allocated for synchronization, channel quality measurements and feedback, proximity sensing of other UEs, transmission of control information, device discovery or data transmission.

Example 52

The Example apparatus of example 51 may also include a proximity sensing or device discovery component for execution by the processor circuit to transmit or receive a beacon transmission or discovery signal via use of a first D2D operational zone including a P-DL subframe allocated for proximity sensing or device discovery. The beacon transmission may be capable of indicating to the second UE that the first UE is in proximity of the second UE. The example apparatus of example 51 may also include an establish component for execution by the processor circuit to establish a communication link with the second UE based on exchanged discovery packets via allocated P-DL subframes and use a third D2D operational zone including P-UL, P-S or P-DL subframes allocated for data transmission to send the D2D data communication from the second UE.

Example 53

The Example apparatus of example 52, the D2D data communication associated with one of a unicast session, a broadcast session or a groupcast session with the second UE over the communication link.

Example 54

The Example apparatus of example 46, the first UE and the second UE located may be within a coverage area of a wireless wide area network (WWAN) capable of operating in compliance with one or more 3GPP LTE standards including LTE-A. For this example, the synchronization source may include an evolved node B (eNB) for the WWAN.

Example 55

The Example apparatus of example 54, the eNB may be capable of determining and indicating via system information block (SIB) signaling to the first and second UEs the D2D region that is defined using the set of type 2 frame structure subframes.

Example 56

The Example apparatus of example 46, the first UE may be located within a coverage area of a wireless wide area network (WWAN) capable of operating in compliance with one or more 3GPP LTE standards including LTE-A. For this example, the synchronization source including an evolved node B (eNB) for the WWAN.

Example 57

The Example apparatus of example 56, the second UE may be located outside the coverage area of the WWAN, the first UE capable of being a second synchronization source and sending a second synchronization signal for the second UE to obtain time and frequency synchronization for use of the D2D region to communicate with the first UE. For this example, the first UE may also be capable of relaying the system information to the second UE.

Example 58

The Example apparatus of example 57, the second synchronization signal may be differentiated from the first synchronization signal by one of an offset in a frequency domain or use of a modified sequence for the second synchronization signal as compared to a sequence for the first synchronization signal.

Example 59

The Example apparatus of example 46, the first and second UEs may be located outside a coverage area of a wireless wide area network (WWAN) capable of operating in compliance with one or more 3GPP LTE standards including LTE-A. For this example, the synchronization source may include a third UE located within the coverage area. The third UE may be capable of transmitting the synchronization signal to the first and second UEs. The third UE may also be capable of relaying the system information to the first and second UEs.

Example 60

The Example apparatus of example 46, the first and second UEs may be located outside a coverage area of a wireless wide area network (WWAN) capable of operating in compliance with one or more 3GPP LTE standards including LTE-A, the first UE capable of communicating using a dedicated public safety spectrum. For this example, the synchronization source may include a third UE located outside the coverage area and capable of communicating using the dedicated public safety spectrum.

Example 61

The Example apparatus of example 60, the system information may be received from the third UE via the dedicated public safety spectrum.

Example 62

An Example method for D2D communications may include receiving, at a first user equipment (UE) capable of operating in compliance with one or more $3^{rd}$ Generation Partnership Project (3GPP) Long Term Evolution (LTE) standards including LTE-Advanced (LTE-A), system information that indicates a D2D region that is defined using a set of type 2 frame structure subframes. The example method may also include receiving a synchronization signal from a synchronization source to obtain time and frequency synchronization for use of the D2D region to communicate with a second. The example method may also include sending a D2D data communication to the second UE based on use of the D2D region.

Example 63

The Example method of example 62, comprising the D2D region based on a given uplink-downlink configuration from among uplink-downlink configurations as defined by LTE-A for time-division duplex (TDD), with D2D signals received from the second UE during an uplink subframe allocated as a proximity uplink (P-UL) subframe.

Example 64

The Example method of example 62, the D2D region may be based on an uplink-downlink configuration that modifies at least some uplink or downlink subframes for one or more uplink-downlink configurations as defined by LTE-A for time-division duplex (TDD), with D2D signals sent to the second UE during an uplink subframe allocated as a proximity downlink (P-DL) subframe for sending data transmission to other UEs.

Example 65

The Example method of example 64, the at least some uplink or downlink subframes may be modified responsive to a load balancing condition between at least the first and second UEs or responsive to interference management between at least the first and second UEs.

Example 66

The Example method of example 62, the set of type 2 frame structure subframes may be arranged in a plurality of subsets, each subset allocated to one of a plurality D2D operational zones.

Example 67

The Example method of example 66, the plurality of D2D operational zones may each including one or more proximity downlink (P-DL), proximity uplink (P-UL) or proximity special (P-S) subframes allocated for synchronization, channel quality measurements and feedback, proximity sensing of other UEs, transmission of control information, device discovery or data transmission.

Example 68

The Example method of example 67 may also include receiving a beacon transmission or discovery signal via use of a first D2D operational zone including a P-DL subframe allocated for proximity sensing or device discovery. The beacon transmission may be capable of indicating to the second UE that the first UE is in proximity of the second UE. The example method of example 67 may also include establishing a communication link with the second UE based on exchanged discovery packets via allocated P-DL subframes and use a third D2D operational zone including P-UL, P-S or P-DL subframes allocated for data transmission to send the D2D data communication from the second UE.

Example 69

The Example method of example 68, the D2D data communication associated with one of a unicast session, a broadcast session or a groupcast session with the second UE over the communication link.

Example 70

The Example method of example 62, the first UE and the second UE may be located within a coverage area of a wireless wide area network (WWAN) capable of operating in compliance with one or more 3GPP LTE standards including LTE-A. For this example, the synchronization source may include an evolved node B (eNB) for the WWAN.

Example 71

The example method of example 70, the eNB may be capable of determining and indicating via SIB signaling to the first and second UEs the D2D region that is defined using the set of type 2 frame structure subframes.

Example 72

The Example method of example 62, the first UE may be located within a coverage area of a wireless wide area network (WWAN) capable of operating in compliance with one or more 3GPP LTE standards including LTE-A. For this example, the synchronization source may include an evolved node B (eNB) for the WWAN.

Example 73

The Example method of example 72, the second UE may be located outside the coverage area of the WWAN. The first UE may be capable of being a second synchronization source and sending a second synchronization signal for the second UE to obtain time and frequency synchronization for use of the D2D region to communicate with the first UE. The first UE may also be capable of relaying the system information to the second UE.

Example 74

The Example method of example 72, the second synchronization signal may be differentiated from the first synchronization signal by one of an offset in a frequency domain or use of a modified sequence for the second synchronization signal as compared to a sequence for the first synchronization signal.

Example 75

The Example method of example 62, the first and second UEs may be located outside a coverage area of a wireless wide area network (WWAN) capable of operating in compliance with one or more 3GPP LTE standards including LTE-A. For this example, the synchronization source may include a third UE located within the coverage area. The third UE may be capable of transmitting the synchronization signal to the first and second UEs. the third UE may also be capable of relaying the system information to the first and second UEs.

Example 76

The Example method of example 62, the first and second UEs may be located outside a coverage area of a wireless wide area network (WWAN) capable of operating in compliance with one or more 3GPP LTE standards including LTE-A. The first UE may be capable of communicating using a dedicated public safety spectrum. For this example, the synchronization source may include a third UE located outside the coverage area and capable of communicating using the dedicated public safety spectrum.

Example 77

The Example method of example 76, the system information may be received from the third UE via the dedicated public safety spectrum.

Example 78

An Example at least one machine readable medium may include a plurality of instructions that in response to being executed on a system at user equipment (UE) may cause the system to carry out an example method according to any one of examples 62 to 77.

Example 79

An Example apparatus may include means for performing the example methods of any one of examples 62 to 77.

Example 80

An Example at least one machine readable medium may include a plurality of instructions that in response to being executed on a system for a first user equipment (UE) capable of operating in compliance with one or more or more $3^{rd}$ Generation Partnership Project (3GPP) Long Term Evolution (LTE) standards including LTE-Advanced (LTE-A) may cause the system to receive system information that indicates a device-to-device (D2D) region that is defined using a set of type 2 frame structure subframes. The instructions may also cause the system to receive a synchronization signal from a synchronization source to obtain time and frequency synchronization for use of the D2D region to communicate with a second UE. The instructions may also cause the system to send a D2D data communication to the second UE based on use of the D2D region.

Example 81

The Example at least one machine readable medium of example 80, the D2D region may be based on a given uplink-downlink configuration from among uplink-downlink configurations as defined by LTE-A for time-division duplex (TDD), with D2D signals received from the second UE during an uplink subframe allocated as a proximity uplink (P-UL) subframe.

Example 82

The Example at least one machine readable medium of example 80, the D2D region may be based on an uplink-downlink configuration that modifies at least some uplink or downlink subframes for one or more uplink-downlink configurations as defined by LTE-A for time-division duplex (TDD), with D2D signals sent to the second UE during an uplink subframe allocated as a proximity downlink (P-DL) subframe for sending data transmission to other UEs.

Example 83

The Example at least one machine readable medium of example 82, the at least some uplink or downlink subframes may be modified responsive to a load balancing condition between at least the first and second UEs or responsive to interference management between at least the first and second UEs.

Example 84

The Example at least one machine readable medium of example 80, the set of type 2 frame structure subframes may be arranged in a plurality of subsets, each subset allocated to one of a plurality D2D operational zones.

Example 85

The Example at least one machine readable medium of example 84, the plurality of D2D operational zones may each include one or more proximity downlink (P-DL), proximity uplink (P-UL) or proximity special (P-S) subframes allocated for synchronization, channel quality measurements and feedback, proximity sensing of other UEs, transmission of control information, device discovery or data transmission.

Example 86

The Example at least one machine readable medium of example 85, the instructions may further cause the system to receive a beacon transmission or discovery signal via use of a first D2D operational zone including a P-DL subframe allocated for proximity sensing or device discovery. The beacon transmission may be capable of indicating to the second UE that the first UE is in proximity of the second UE. The instructions may also cause the system to establish a communication link with the second UE based on exchanged discovery packets via allocated P-DL subframes and use a third D2D operational zone including P-UL, P-S or P-DL subframes allocated for data transmission to send the D2D data communication from the second UE.

Example 87

The Example at least one machine readable medium of example 86, the D2D data communication may be associated with one of a unicast session, a broadcast session or a groupcast session with the second UE over the communication link.

Example 88

The Example at least one machine readable medium of example 80, the first UE and the second UE may be located within a coverage area of a wireless wide area network (WWAN) capable of operating in compliance with one or more 3GPP LTE standards including LTE-A. For this example, the synchronization source ma include an evolved node B (eNB) for the WWAN.

Example 89

The Example at least one machine readable medium of example 88, the eNB may be capable of determining and indicating via system information block (SIB) signaling to the first and second UEs the D2D region that is defined using the set of type 2 frame structure subframes.

Example 90

The Example at least one machine readable medium of example 80, the first UE may be located within a coverage area of a wireless wide area network (WWAN) capable of operating in compliance with one or more 3GPP LTE standards including LTE-A. For this example, the synchronization source including an evolved node B (eNB) for the WWAN.

Example 91

The Example at least one machine readable medium of example 80, the second UE may be located outside the coverage area of the WWAN. The first UE may be capable of being a second synchronization source and sending a second synchronization signal for the second UE to obtain time and frequency synchronization for use of the D2D region to communicate with the first UE. The first UE may also be capable of relaying the system information to the second UE.

Example 92

The Example at least one machine readable medium of example 80, the second synchronization signal may be differentiated from the first synchronization signal by one of an offset in a frequency domain or use of a modified sequence for the second synchronization signal as compared to a sequence for the first synchronization signal.

Example 93

The Example at least one machine readable medium of example 80, the first and second UEs may be located outside a coverage area of a wireless wide area network (WWAN) capable of operating in compliance with one or more 3GPP LTE standards including LTE-A, the synchronization source including a third UE located within the coverage area. The third UE may be capable of transmitting the synchronization signal to the first and second UEs. The third UE may also be capable of relaying the system information to the first and second UEs.

Example 94

The Example at least one machine readable medium of example 80, the first and second UEs may be located outside a coverage area of a wireless wide area network (WWAN) capable of operating in compliance with one or more 3GPP LTE standards including LTE-A. The first UE may be capable of communicating using a dedicated public safety spectrum. For this example, the synchronization source may include a third UE located outside the coverage area and capable of communicating using the dedicated public safety spectrum.

Example 95

The Example at least one machine readable medium of example 94, the system information may be received from the third UE via the dedicated public safety spectrum.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
a processor circuit for a first user equipment (UE) capable of operating in compliance with one or more $3^{rd}$ Generation Partnership Project (3GPP) Long Term Evolution (LTE) standards including LTE-Advanced (LTE-A);

an access component for execution by the processor circuit to receive system information that indicates a device-to-device (D2D) region comprising a plurality of D2D region subframes, the D2D region defined using a set of type 2 frame structure subframes, the system information to indicate a plurality of D2D operational zones of the D2D region, each of the plurality of D2D operational zones to comprise a respective subset of the D2D region subframes, each of the plurality of D2D operational zones to include at least one D2D region subframe allocated for synchronization, channel quality measurements and feedback, proximity sensing of other UEs, transmission of control information, device discovery, or data transmission;

a synchronization component for execution by the processor circuit to receive a synchronization signal from a synchronization source to obtain time and frequency synchronization for use of the D2D region to communicate with a second UE;

a proximity sensing or device discovery component for execution by the processor circuit to receive or transmit a beacon transmission or discovery signal via use of a first D2D operational zone including a D2D region subframe allocated for proximity sensing or device discovery, the beacon transmission or discovery signal capable of indicating to the proximity sensing or device discovery component that the second UE is in proximity of the first UE;

an establish component for execution by the processor circuit to establish a communication link with the second UE based on exchanged discovery packets via allocated D2D region subframes; and a communication component for execution by the processor circuit to receive a D2D data communication from the second UE based on use of the D2D region, the communication component to use a third D2D operational zone including D2D region subframes allocated for data transmission to receive the D2D data communication from the second UE.

2. The apparatus of claim 1, the D2D region defined based on a given uplink-downlink configuration from among uplink-downlink configurations as defined by LTE-A for time-division duplex (TDD), with D2D signals received from the second UE during a D2D subframe comprising an uplink subframe according to the given uplink-downlink configuration.

3. The apparatus of claim 1, the D2D region defined based on an uplink-downlink configuration that modifies at least some uplink or downlink subframes for one or more uplink-downlink configurations as defined by LTE-A for time-division duplex (TDD), with D2D signals received from the second UE during a D2D region subframe comprising a downlink subframe according to the given uplink-downlink configuration.

4. The apparatus of claim 3, the at least some uplink or downlink subframes to be modified responsive to a load balancing condition between at least the first and second UEs or responsive to interference management between at least the first and second UEs.

5. The apparatus of claim 1, the D2D data communication associated with one of a unicast session, a broadcast session or a groupcast session with the second UE over the communication link.

6. The apparatus of claim 1, comprising a digital display coupled to the processor circuit to present a user interface view.

7. A method comprising:
receiving, at a first user equipment (UE) capable of operating in compliance with one or more $3^{rd}$ Generation Partnership Project (3GPP) Long Term Evolution (LTE) standards including LTE-Advanced (LTE-A), system information that indicates a device-to-device (D2D) region comprising a plurality of D2D region subframes, the D2D region defined using a set of type 2 frame structure subframes, the system information to indicate a plurality of D2D operational zones of the D2D region, each of the plurality of D2D operational zones to comprise a respective subset of the D2D region subframes;

receiving a synchronization signal from a synchronization source to obtain time and frequency synchronization for use of the D2D region to communicate with a second UE, the first and second UEs located outside a coverage area of a wireless wide area network (WWAN) capable of operating in compliance with one or more 3GPP LTE standards including LTE-A, the synchronization source including a third UE located within the coverage area, the third UE capable of transmitting the synchronization signal to the first and second UEs, the third UE also capable of relaying the system information to the first and second UEs; and receiving a D2D data communication from the second UE based on use of the D2D region.

8. The method of claim 7, the D2D region defined based on a given uplink-downlink configuration from among uplink-downlink configurations as defined by LTE-A for time-division duplex (TDD), with D2D signals received from the second UE during a D2D region subframe comprising an uplink subframe according to the given uplink-downlink configuration.

9. The method of claim 7, the D2D region defined based on an uplink-downlink configuration that modifies at least some uplink or downlink subframes for one or more uplink-downlink configurations as defined by LTE-A for time-division duplex (TDD), with D2D signals received from the second UE during a D2D region subframe comprising a downlink subframe according to the given uplink-downlink configuration.

10. The method of claim 7, each of the plurality of D2D operational zones to include at least one D2D region subframe allocated for synchronization, channel quality measurements and feedback, proximity sensing of other UEs, transmission of control information, device discovery or data transmission.

11. The method of claim 10, comprising:
receiving a beacon transmission or discovery signal via use of a first D2D operational zone including a D2D region subframe allocated for proximity sensing or device discovery, the beacon transmission or discovery signal capable of indicating that the second UE is in proximity of the first UE; and establishing a communication link with the second UE based on exchanged discovery packets and using a third D2D operational zone including D2D region subframes allocated for data transmission to receive the D2D data communication from the second UE.

12. The method of claim 7, the first and second UEs capable of communicating using a dedicated public safety spectrum, the synchronization source including the second UE, the system information received from the second UE.

13. At least one non-transitory machine readable medium comprising a plurality of instructions that in response to being executed on a system for a first user equipment (UE) capable of operating in compliance with one or more or more $3^{rd}$ Generation Partnership Project (3GPP) Long Term Evolution (LTE) standards including LTE-Advanced (LTE-A) causes the system to:
- receive system information that indicates a device-to-device (D2D) region comprising a plurality of D2D region subframes, the D2D region defined using a set of type 2 frame structure subframes, the system information to indicate a plurality of D2D operational zones of the D2D region, each of the plurality of D2D operational zones to comprise a respective subset of the D2D region subframes;
- receive a synchronization signal from a synchronization source to obtain time and frequency synchronization for use of the D2D region to communicate with a second UE, the first and second UEs located outside a coverage area of a wireless wide area network (WWAN) capable of operating in compliance with one or more 3GPP LTE standards including LTE-A, the first UE capable of communicating using a dedicated public safety spectrum, the synchronization source including a third UE located outside the coverage area and capable of communicating using the dedicated public safety spectrum, the system information received from the third UE via the dedicated public safety spectrum; and
- send a D2D data communication to the second UE based on use of the D2D region.

14. The at least one non-transitory machine readable medium of claim 13, the D2D region defined based on a given uplink-downlink configuration from among uplink-downlink configurations as defined by LTE-A for time-division duplex (TDD), with D2D signals received from the second UE during a D2D region subframe comprising an uplink subframe according to the given uplink-downlink configuration.

15. The at least one non-transitory machine readable medium of claim 13, the D2D region defined based on an uplink-downlink configuration that modifies at least some uplink or downlink subframes for one or more uplink-downlink configurations as defined by LTE-A for time-division duplex (TDD), with D2D signals sent to the second UE during a D2D region subframe comprising a downlink subframe according to the given uplink-downlink configuration.

16. The at least one non-transitory machine readable medium of claim 13, each of the plurality of D2D operational zones to include at least one D2D region subframe allocated for synchronization, channel quality measurements and feedback, proximity sensing of other UEs, transmission of control information, device discovery or data transmission.

17. The at least one non-transitory machine readable medium of claim 16, the instructions to further cause the system to:
- receive a beacon transmission or discovery signal via use of a first D2D operational zone including a D2D region subframe allocated for proximity sensing or device discovery, the beacon transmission or discovery signal capable of indicating to the second UE that the first UE is in proximity of the second UE; and
- establish a communication link with the second UE based on the exchanged discovery packets and use a third D2D operational zone including D2D region subframes allocated for data transmission to send the D2D data communication from the second UE.

* * * * *